US012372995B2

(12) United States Patent
Mock et al.

(10) Patent No.: US 12,372,995 B2
(45) Date of Patent: Jul. 29, 2025

(54) APPLIANCE KNOB ASSEMBLY

(71) Applicant: WHIRLPOOL CORPORATION, Benton Harbor, MI (US)

(72) Inventors: Brandon Tyler Mock, St. Joseph, MI (US); John Jay Myers, Saugatuck, MI (US); Nicholas Hill Schutte, St. Joseph, MI (US); Andrea Hutchins, St. Joseph, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 219 days.

(21) Appl. No.: 18/174,924

(22) Filed: Feb. 27, 2023

(65) Prior Publication Data

US 2023/0280779 A1    Sep. 7, 2023

Related U.S. Application Data

(60) Provisional application No. 63/315,571, filed on Mar. 2, 2022.

(51) Int. Cl.
*G05G 5/03* (2008.04)
*A47J 43/046* (2006.01)
(Continued)

(52) U.S. Cl.
CPC ............. *G05G 5/03* (2013.01); *A47J 43/046* (2013.01); *A47J 43/0716* (2013.01); *G05G 1/10* (2013.01);
(Continued)

(58) Field of Classification Search
CPC ........ G05G 5/03; G05G 1/10; G05G 2505/00; A47J 43/046; A47J 43/0716; H01H 19/14
See application file for complete search history.

(56) References Cited

U.S. PATENT DOCUMENTS 2,177,760 A * 10/1939 Wheat .................. H03J 1/14
74/10.8
3,208,558 A * 9/1965 Schierbeek ........... G01G 23/34
188/164

(Continued)

FOREIGN PATENT DOCUMENTS

EP    2442335 B1    6/2016
EP    4239437 A1 *  9/2023  ............ A47J 43/046
(Continued)

OTHER PUBLICATIONS

Translation of WO-2024111899-A1, Lee et al., May 30, 2024 (Year: 2024).*

(Continued)

*Primary Examiner* — Thomas C Diaz
(74) *Attorney, Agent, or Firm* — Price Heneveld LLP

(57) ABSTRACT

An appliance includes a base unit having a sidewall surrounding an interior cavity. A shaft assembly includes a first portion extending outwardly from the sidewall of the base unit. The shaft assembly further includes a second portion positioned within the interior cavity. A weighted member is operably coupled to the second portion of the shaft assembly for rotation therewith. The weighted member outwardly extends from the shaft assembly. A knob is positioned on the first portion of the shaft assembly for rotation therewith. The weighted member increases the rotational inertia of the knob assembly as operably coupled thereto through the shaft assembly.

20 Claims, 18 Drawing Sheets

(51) Int. Cl.
*A47J 43/07* (2006.01)
*G05G 1/10* (2006.01)
*H01H 19/14* (2006.01)

(52) U.S. Cl.
CPC ......... H01H 19/14 (2013.01); *G05G 2505/00* (2013.01)

(56) References Cited

U.S. PATENT DOCUMENTS

| | | |
|---|---|---|
| 3,269,211 A | 8/1966 | McGarry |
| 3,528,306 A * | 9/1970 | Dickinson ................. H03J 1/14 74/10.8 |
| 3,528,307 A * | 9/1970 | Bell .......................... H03J 1/14 74/10.8 |
| 7,171,727 B2 | 2/2007 | Wylie et al. |
| 7,255,061 B2 | 8/2007 | Denton |
| 7,462,795 B2 | 12/2008 | Montalvo |
| 8,188,989 B2 | 5/2012 | Levin et al. |
| 8,997,591 B1 | 4/2015 | Vircks |
| 9,146,033 B2 | 9/2015 | Cadima et al. |
| 10,824,183 B1 * | 11/2020 | Cruz-Pérez .............. G05G 1/12 |
| 2016/0097541 A1 | 4/2016 | Choi |
| 2016/0256003 A1 | 9/2016 | Altenritter et al. |
| 2021/0059476 A1 | 3/2021 | Jung et al. |
| 2021/0223812 A1 * | 7/2021 | Choi ....................... G05G 5/005 |
| 2023/0276997 A1 * | 9/2023 | Aditjandra ............ A47J 43/046 366/197 |

FOREIGN PATENT DOCUMENTS

| | | | | |
|---|---|---|---|---|
| WO | WO-2018054801 A1 * | 3/2018 | ............ | D06F 34/30 |
| WO | WO-2024111899 A1 * | 5/2024 | ............ | F24C 15/00 |

OTHER PUBLICATIONS

Translation of WO-2018054801-A1, Ertas et al., Mar. 29, 2018 (Year: 2018).*

Define weight and mass, Microsoft Bing, Nov. 25, 2024 (Year: 2024).*

* cited by examiner

US 12,372,995 B2

APPLIANCE KNOB ASSEMBLY

CROSS-REFERENCE TO RELATED APPLICATION

This application claims priority to and the benefit under 35 U.S.C. § 119(e) of U.S. Provisional Patent Application No. 63/315,571, filed on Mar. 3, 2022, entitled APPLIANCE KNOB ASSEMBLY, the entire disclosure of which is hereby incorporated herein by reference.

BACKGROUND OF THE DISCLOSURE

The present disclosure generally relates to a user interface for an appliance, and more specifically, to a user interface having a rotatable knob coupled to a weighted member configured to increase rotational inertia realized by a user when rotating the knob.

SUMMARY OF THE DISCLOSURE

According to one aspect of the present disclosure, an appliance includes a base unit having a sidewall surrounding an interior cavity. A shaft assembly includes a first portion extending outwardly from the sidewall of the base unit. The shaft assembly further includes a second portion positioned within the interior cavity. A weighted member is operably coupled to the second portion of the shaft assembly for rotation therewith. A knob is positioned on the first portion of the shaft assembly for rotation therewith. The weighted member increases the rotational inertia of the knob assembly as operably coupled thereto through the shaft assembly.

According to another aspect of the present disclosure, an appliance includes a base unit having a sidewall surrounding an interior cavity. A shaft assembly is disposed through the sidewall of the base unit and includes first and second portions. A knob is operably coupled to the first portion of the shaft assembly and is externally accessible relative to the base unit. A weighted member is operably coupled to the second portion of the shaft assembly for rotation therewith. The weighted member is positioned within the interior cavity of the base unit.

According to yet another aspect of the present disclosure, an appliance includes a base unit having a sidewall surrounding an interior cavity. A shaft member includes first and second ends. The second end is positioned within the interior cavity of the base unit and the first end is externally accessible relative to the base unit. A knob is positioned on the first end of the shaft member. The knob includes a head portion and a stem portion extending inwardly from the head portion. A distal end of the stem portion is positioned within the interior cavity of the base unit. A weighted member is operably coupled to the second end of the shaft member for rotation therewith within the interior cavity of the base unit.

According to one aspect of the present disclosure, an appliance includes a base unit with a sidewall surrounding an interior cavity. A shaft assembly includes a first portion extending outwardly from the sidewall of the base unit and a second portion positioned within the interior cavity. A weighted member is operably coupled to the second portion of the shaft assembly for rotation therewith. A knob is positioned on the first portion of the shaft assembly for rotation therewith.

According to another aspect of the present disclosure, an appliance includes a base unit with a sidewall surrounding an interior cavity. A shaft assembly is disposed through the sidewall of the base unit and includes first and second portions. A knob is operably coupled to the first portion of the shaft assembly and is externally accessible relative to the base unit. A weighted member is operably coupled to the second portion of the shaft assembly for rotation therewith. The weighted member is positioned within the interior cavity of the base unit.

According to yet another aspect of the present disclosure, an appliance includes a base unit with a sidewall surrounding an interior cavity. A shaft member includes a first end and a second end. The second end is positioned within the interior cavity of the base unit and the first end is externally accessible relative to the base unit. A knob is positioned on the first end of the shaft member. A weighted member is operably coupled to the second end of the shaft member for rotation therewith within the interior cavity of the base unit.

These and other features, advantages, and objects of the present disclosure will be further understood and appreciated by those skilled in the art by reference to the following specification, claims, and appended drawings.

DETAILED DESCRIPTION

Figure 1A:
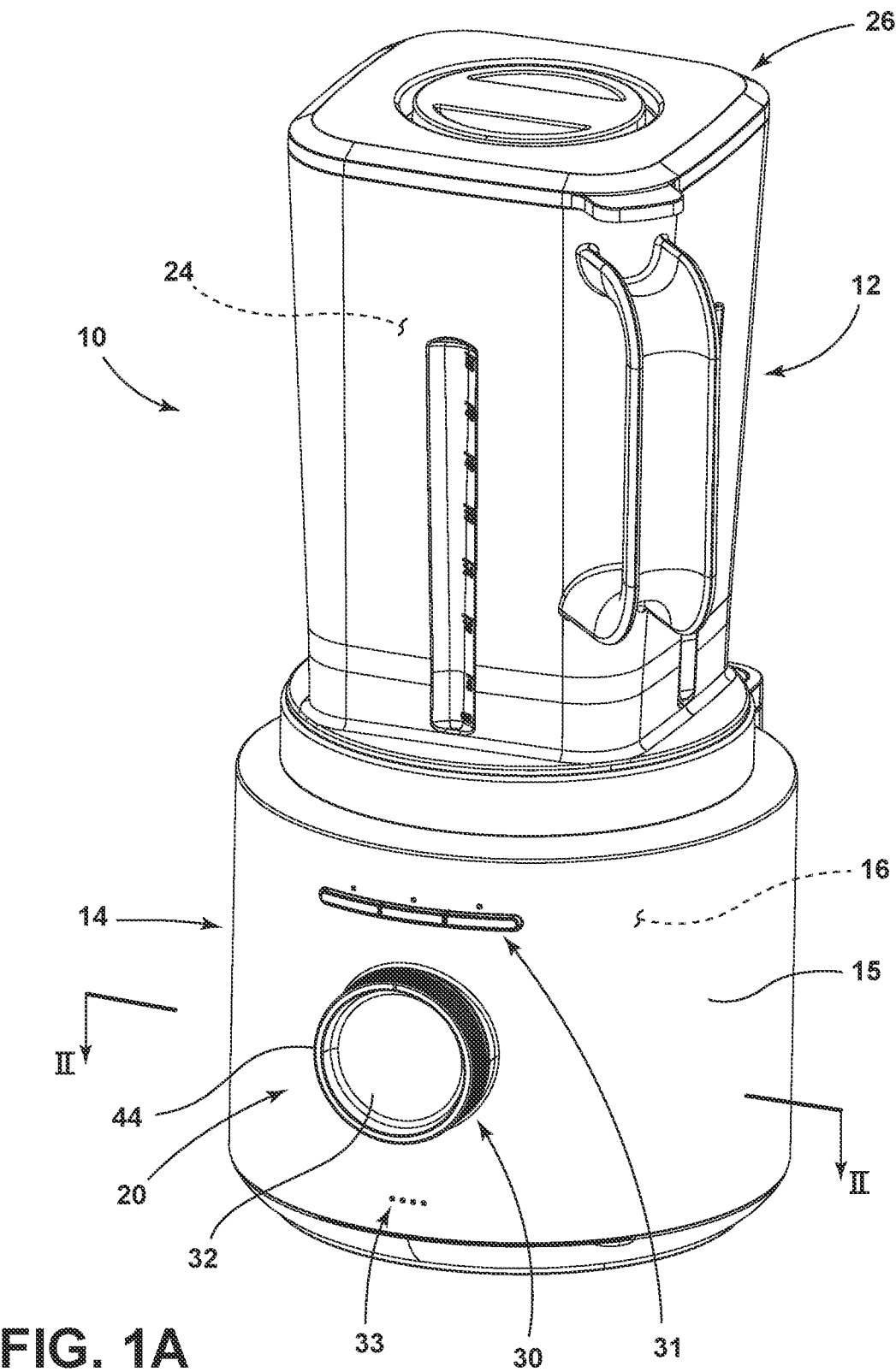
FIG. 1A is a top perspective view of an appliance having a base unit, a jar assembly and a lid assembly.

The present illustrated embodiments reside primarily in combinations of method steps and apparatus components related to an appliance, and a user interface thereof. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1A. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring now to FIG. 1A, reference numeral 10 generally designates a small appliance in the form of a blender. The blender 10, as shown in FIG. 1A, includes a jar assembly 12 that is selectively supported on a base unit 14. The jar assembly 12 includes an inner cavity 24 and a lid assembly 26 disposed on an open top 28 (FIG. 10) thereof. The base unit 14 includes a sidewall 15 surrounding an interior cavity 16. A motor 18 (FIGS. 2 and 3) is housed within the interior cavity 16 of the base unit 14. In use, the motor 18 is configured to drive a blade assembly disposed within the inner cavity 24 of the jar assembly 12. As further shown in FIG. 1A, the blender 10 includes a user interface 20 which includes a knob 30 that is contemplated to be electronically coupled to the motor 18, and configured to adjust various settings of the motor 18, as further described below. The user interface 20 further includes a number of function buttons 31 and a power level display 33. The function buttons 31 are contemplated to provide functional settings for the blender 10, such as blade rotational direction and other like functions. The knob 30 of the user interface 20 is contemplated to be rotatably coupled to the base unit 14. The knob 30 includes a head portion 32 that includes an outer diameter 44.

Figure 1B:
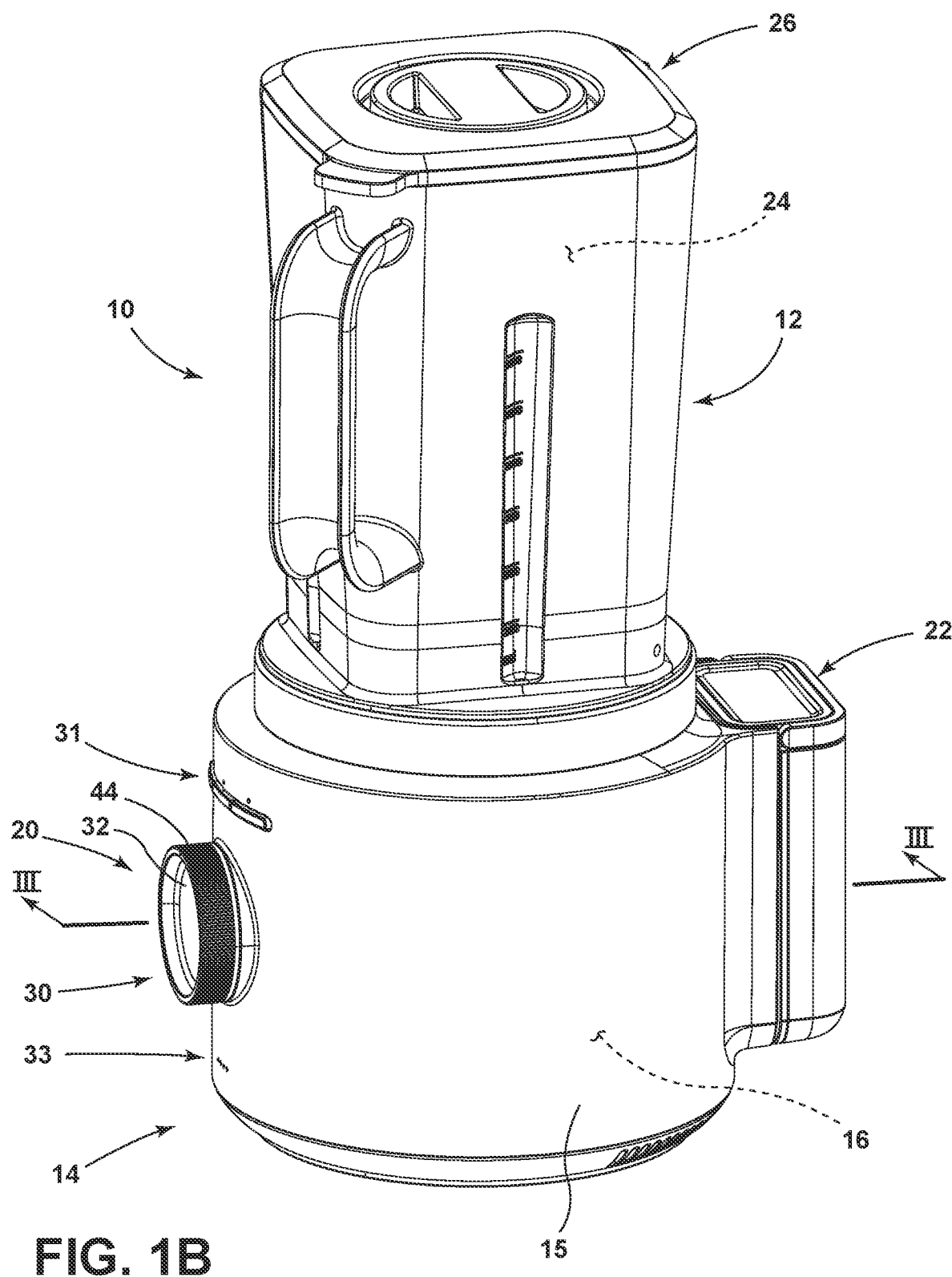
FIG. 1B is a top perspective view of the appliance of FIG. 1A.

Referring now to FIG. 1B, the blender 10 is contemplated to be a cordless appliance that is powered using a rechargeable power source in the form of a removable battery 22. The battery 22 is disclosed in an application titled CHARGER AND BATTERY FOR CORDLESS APPLIANCE that was filed in with the United States Patent and Trademark Office on Mar. 1, 2022, the entirety of which is incorporated herein by reference. The power level display 33 of the user interface 20 is contemplated to provide a visual indicator of the remaining power left in the battery 22.

Figure 2:
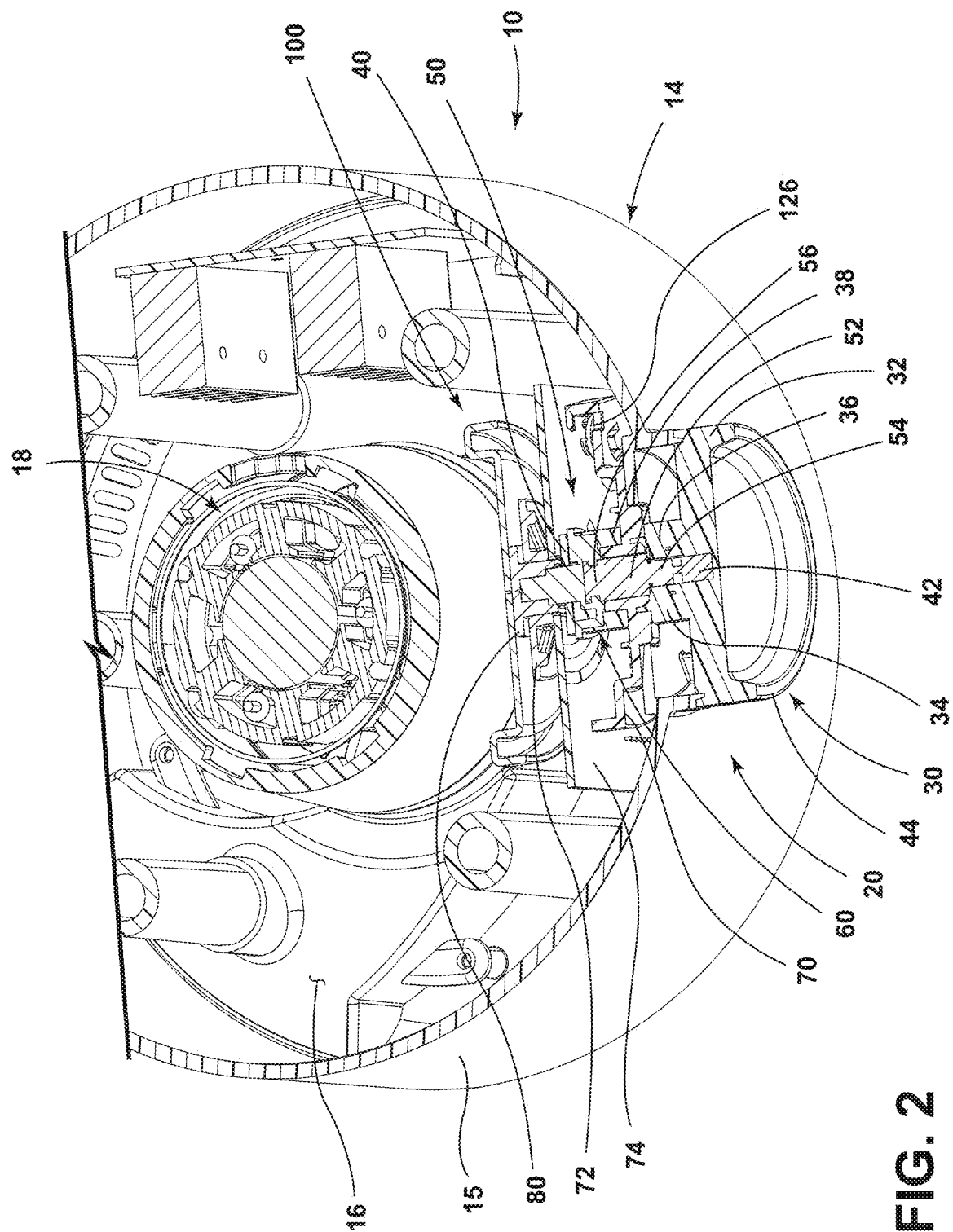
FIG. 2 is a cross-sectional view of the appliance of FIG. 1A taken at line II.

Referring now to FIG. 2, the knob 30 of the user interface 20 is contemplated to be rotatably coupled to the base unit 14. The knob 30 includes a head portion 32 and a stem portion 34 extending inwardly from the head portion 32. The head portion 32 of the knob 30 is positioned outside of the interior cavity 16 of the base unit 14 and is externally accessible relative to the base unit 14. The head portion 32 of the knob 30 is contemplated to be engaged by a user for selecting a motor speed or other like function of the blender 10. The stem portion 34 includes first and second portions 36, 38, and further includes a distal end 40. The second portion 38 and the distal end 40 of the stem portion 34 are positioned within the interior cavity 16 of the base unit 14. The first portion 36 is positioned outside of the interior cavity 16 of the base unit 14 and is externally accessible relative to the base unit 14. The stem portion 34 further includes an interior channel 42 which defines a hollow portion of the knob 30. As used herein, the term "externally accessible" is meant to describe a component part of the blender 10 that is positioned on an exterior of the blender 10. Specifically, the term "externally accessible" describes component parts that can be engaged by a user on the outside portion of the base unit 14, as opposed to component parts of the blender 10 that are disposed within the interior cavity 16 of the base unit 14.

As further shown in FIG. 2, a weighted member 100 is spaced-apart from the knob 30 and operably coupled thereto via a shaft assembly 50. As such, the weighted member 100 is configured for rotation with the shaft assembly 50 and the knob 30. As shown in FIG. 2, the weighted member 100 is positioned within the interior cavity 16 of the base unit 14, while the head portion 32 of the knob 30 is externally accessible relative to the base unit 14. The weighted member 100 provides a sensory experience for a user when the user engages the knob 30 for rotation. Specifically, the weighted member 100 provides an increased moment of inertia or rotational inertia to the rotation of the knob 30 as operably coupled thereto. As used herein, the term "rotational inertia" is meant to indicate the torque needed for a desired angular acceleration about a rotational axis. In the present concept, the rotational axis A1 (FIG. 4) is defined by the shaft assembly 50, such that the rotational inertia (I) (provided specifically by the weighted member 100) is equal to the mass (m) times the square of the perpendicular distance (r) to the axis of rotation A1, which can be expressed as $I=mr^2$.

In the present concept, the knob 30 is contemplated to be comprised of a plastic material that may match the sidewall 15 of the base unit 14, which is also contemplated to be a plastic part. The weighted member 100 is contemplated to be comprised of a metal material to provide a substantial added mass to the shaft assembly 50, thereby increasing the rotational inertia of the knob 30 and the shaft assembly 50. The addition of the weighted member 100 provides a sensory experience to the user that simulates the engagement of a knob that is comprised of metal, or that has the mass of the weighted member 100. As described above, the weighted member 100 is positioned within the interior cavity 16 of the base unit 14, such that the weighted member 100 is concealed within the interior cavity 16 of the base unit 14. In this way, the weighted member 100 may be comprised of a less expensive metal material than a metal material that would be traditionally used for externally accessible knob. Thus, the present concept places mass internal to the base unit 14 of the blender 10 by way of the weighted member 100, which provides a greater opportunity to add mass with geometry optimized for an appropriate moment of inertia to enhance the user experience. The present solution also allows for the knob 30 to be made of materials that are more cost effective than metals, at the same time yielding superior sensorial qualities.

Figure 3:
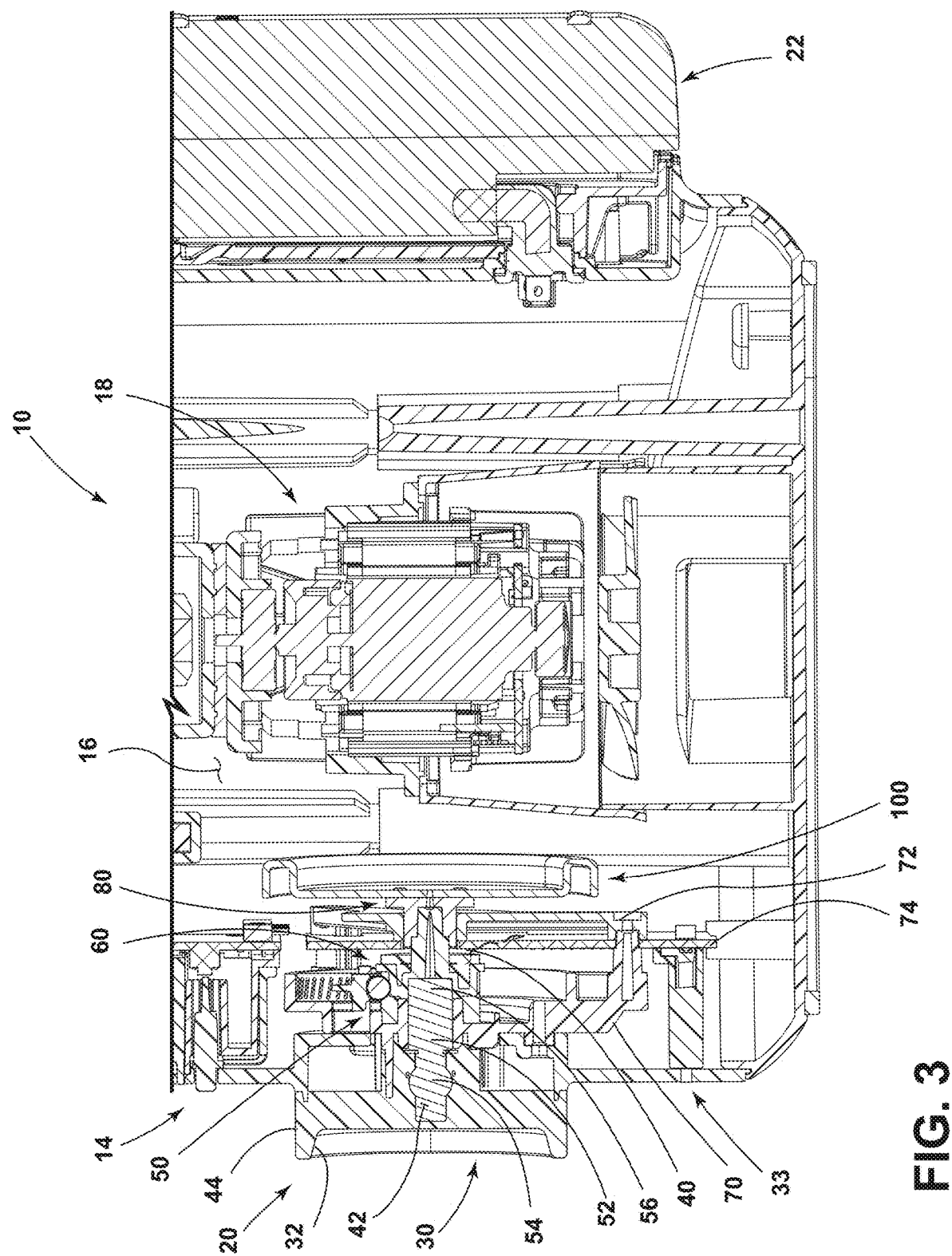
FIG. 3 is a cross-sectional view of the appliance of FIG. 1B taken at line III.

Referring now to FIGS. 2 and 3, the shaft assembly 50 includes a shaft member 52 having first and second ends 54, 56, wherein the second end 56 is positioned within the interior cavity 16 of the base unit 14 and the first end 54 is externally accessible relative to the base unit 14. The first end 54 of the shaft member 52 defines a first portion 53 of the shaft assembly 50. The first end 54 of the shaft member 52 is received within the interior channel 42 of the stem portion 34 of the knob 30 in assembly, such that the shaft member 52 is rigidly coupled to the knob 30 for rotation therewith. As further shown in FIGS. 2 and 3, the shaft assembly 50 also includes a switch assembly 60. The switch assembly 60 is coupled to the second end 56 of the shaft member 52 in a rigid manner for rotation therewith. In use, the switch assembly 60 provides a speed selection for the motor 18 and further provides tactile feedback to the user as a speed selection is made by rotating the knob 30. As further shown in FIGS. 2 and 3, the shaft assembly 50 also includes a mounting bracket 80. In assembly, the mounting bracket 80 interconnects the switch assembly 60 with the weighted member 100. The mounting bracket 80 is rigidly coupled to the switch assembly 60 and the weighted member 100, such that rotation of the knob 30 provides for rotation of the shaft member 52, the switch assembly 60, the mounting bracket 80 and the weighted member 100. As further shown in FIGS. 2 and 3, the shaft assembly 50 is positioned through a number of component parts that do not rotate with the shaft assembly 50. These component parts include a front support bracket 70, a rear support bracket 72 a printed circuit board (PCB) 74.

Figure 4:
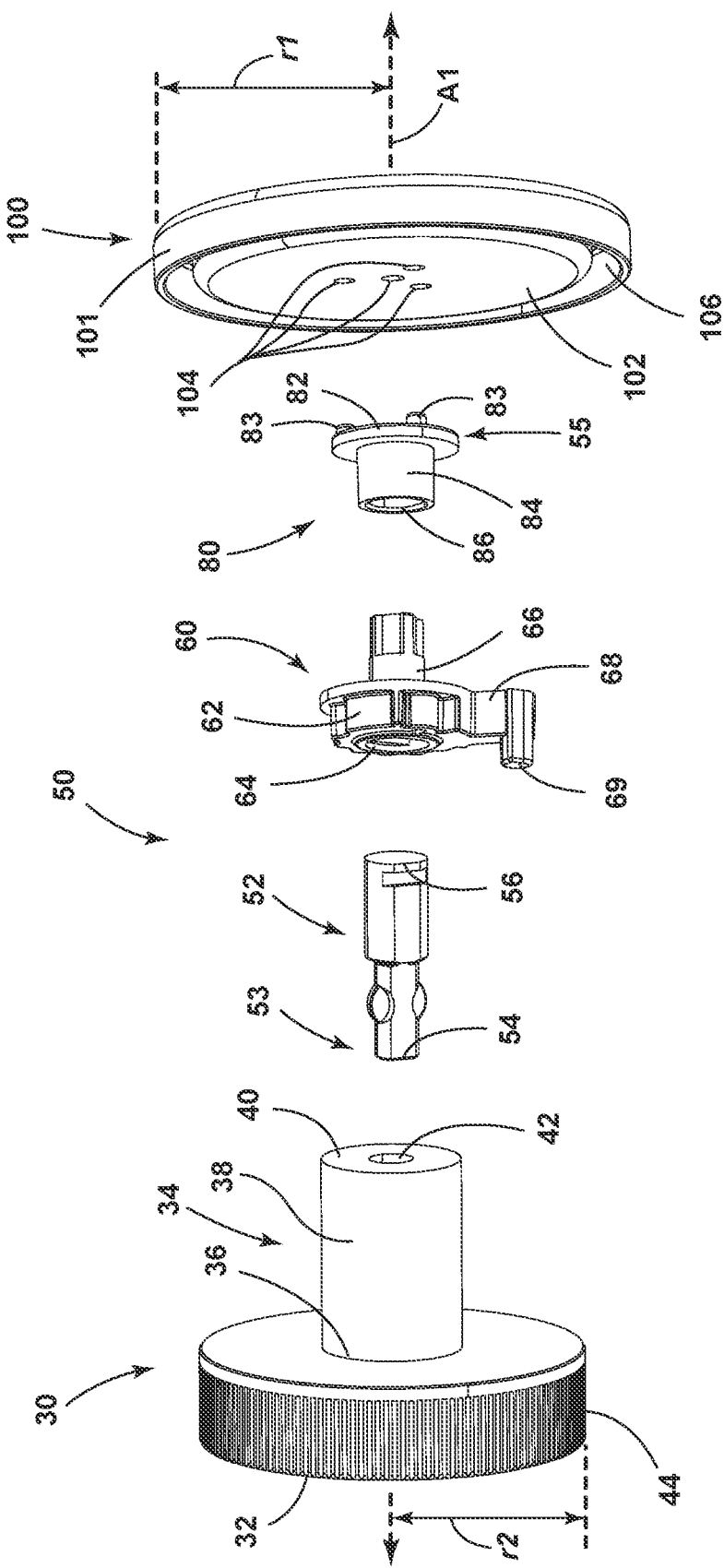
FIG. 4 is an exploded perspective view of a shaft assembly, a knob and a weighted member.

Referring now to FIG. 4, the switch assembly 60 includes a body portion 62 having an interior channel 64 in which the second end 56 of the shaft member 52 is received to fixedly couple the switch assembly 60 to the shaft number 52. The switch assembly 60 further includes a stem portion 66 that inwardly extends from the body portion 62. The switch assembly 60 further includes an engagement member 68 that radially extends from the body portion 62. The engagement member 68 of the switch assembly 60 further includes an outwardly extending flange 69. The engagement member 68 of the switch assembly 60 is configured to engage a spring for biasing rotational movement of the knob 30, as further described below.

With further reference to FIG. 4, the mounting bracket 80 includes a head portion 82 and a stem portion 84 that outwardly extends from the head portion 82. The head portion 82 of the mounting bracket 80 includes mounting bosses 83 which inwardly extend from the head portion 82 and are configured to be received within mounting apertures 104 centrally disposed on the weighted member 100. The head portion 82 of the mounting bracket 80 defines a second portion 55 of the shaft assembly 50. The stem portion 84 of the mounting bracket 80 includes an interior channel 86 in which the stem portion 66 of the switch assembly 60 is received to fixedly couple the switch assembly 60 to the mounting bracket 80.

Figure 5A:
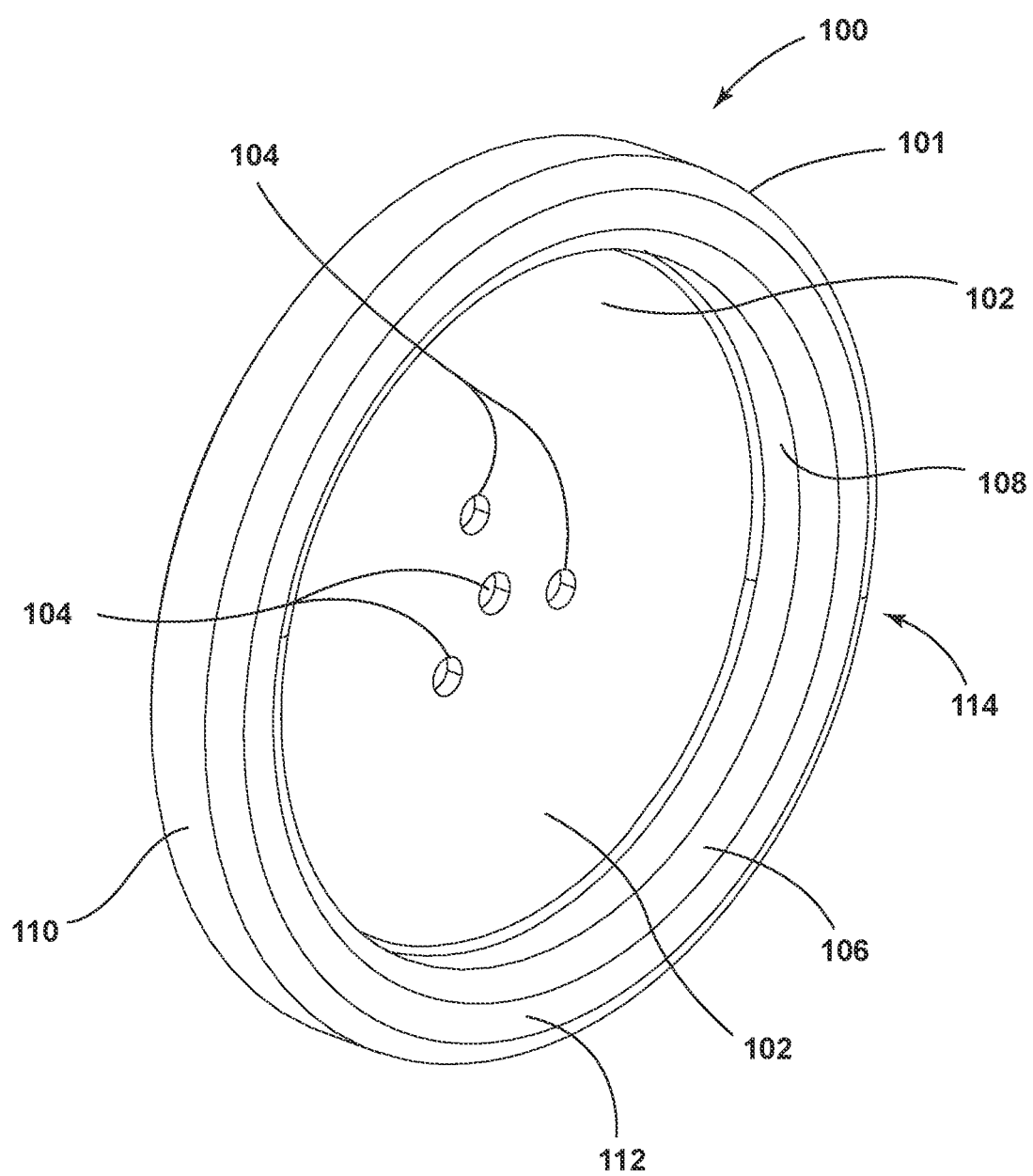
FIG. 5A is a rear perspective view of the weighted member of FIG. 4.
Figure 5B:
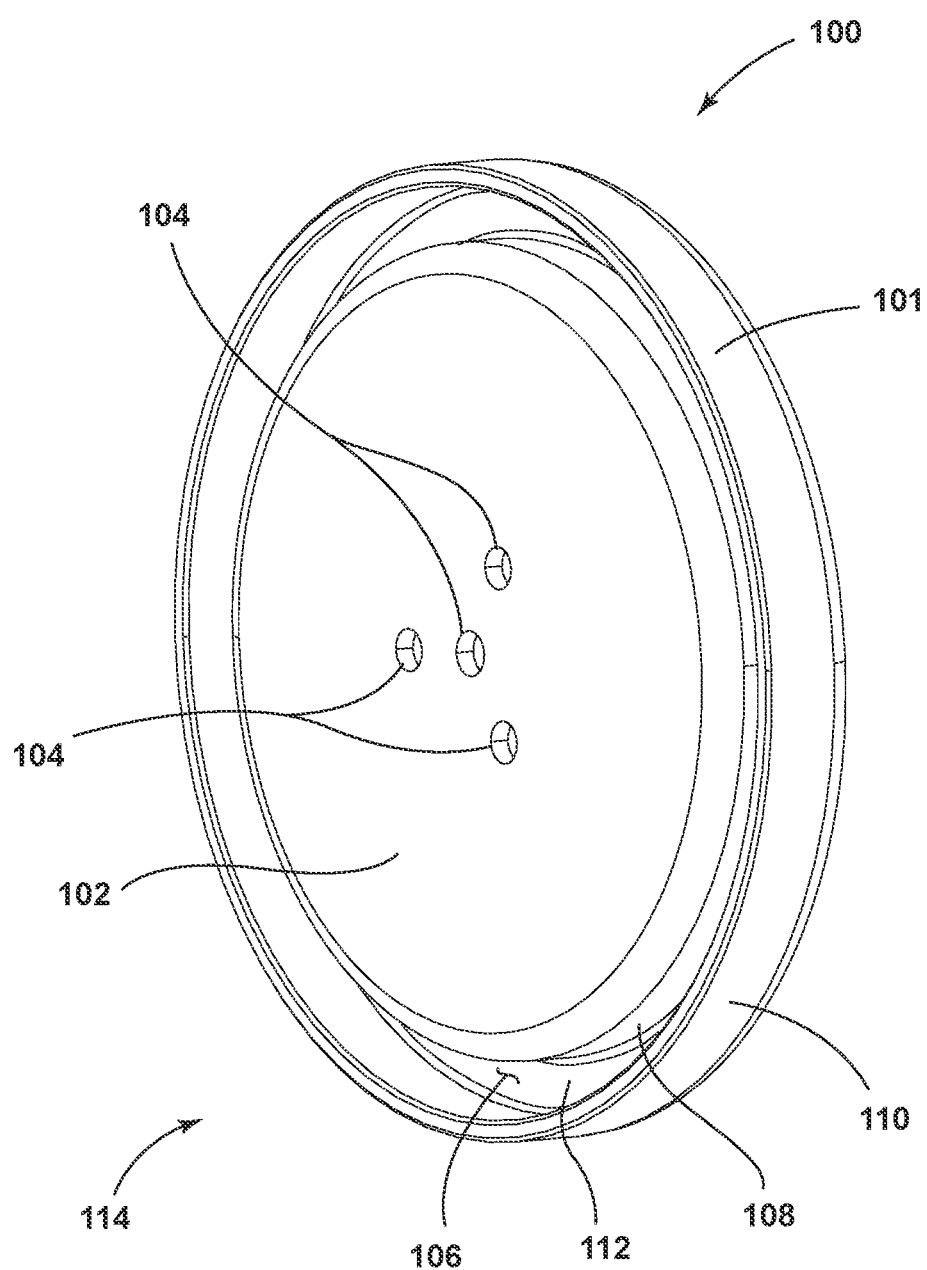
FIG. 5B is a front perspective view of the weighted member of FIG. 5A.

Referring now to FIGS. 5A and 5B, the weighted member 100 is shown having a substantially planar body portion 102. The body portion 102 includes the mounting apertures 104 that are centrally disposed thereon. In assembly, the mounting apertures 104 are configured to receive the mounting bosses 83 of the mounting bracket 80 to fixedly couple the weighted member 100 to the mounting bracket 80, for rotation therewith. The body portion 102 is surrounded by a channel 106, as best shown in FIG. 5B, wherein the channel 106 includes a first sidewall 108 spaced-apart from a second sidewall 110 and interconnected by an intermediate wall 112. In this way, the channel 106 defines an outwardly opening channel on the weighted member 100. As the body portion 102 of the weighted member 100 is a generally planar portion, the channel 106 defines a nonplanar portion of the weighted member 100, providing added mass at an outer perimeter 114 of the weighted member 100. Having the added mass positioned at the outer perimeter 114 of the weighted member 100 increases the moment of inertia or rotational inertia of the weighted member 100, as this added mass of the weighted member 100 is positioned furthest away from the axis of rotation A1 shown in FIGS. 4 and 6. The weighted member 100 further includes an outer diameter 101 which is generally defined by the second sidewall 110 of the channel 106.

Figure 5C:
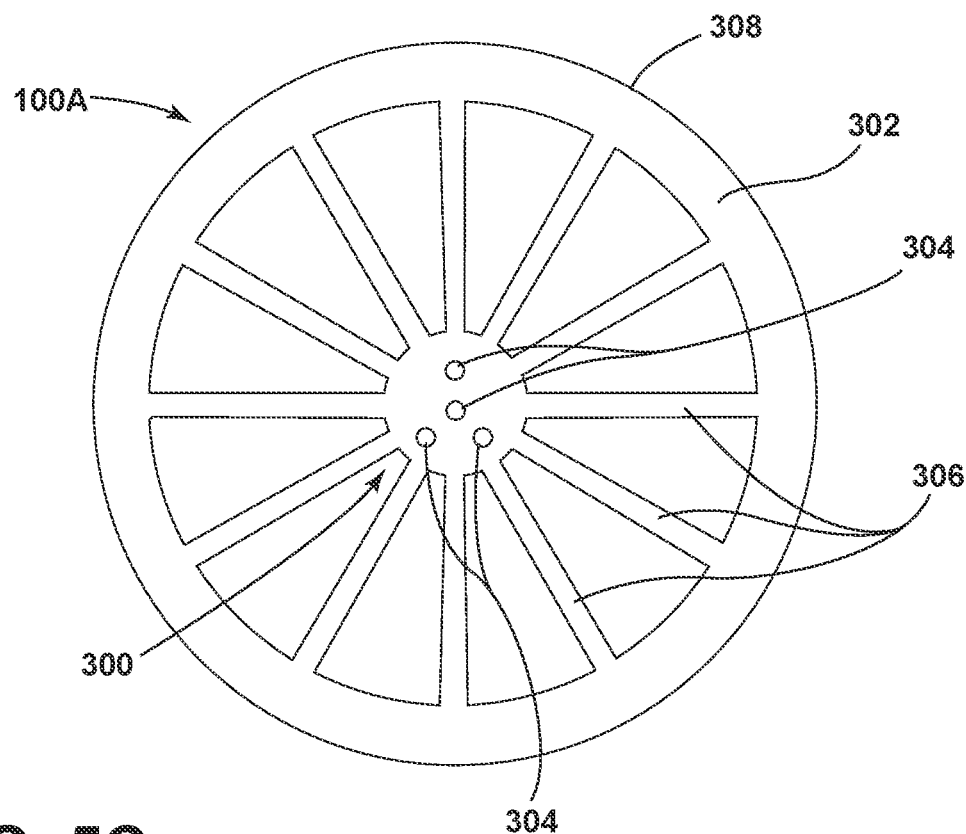
FIG. 5C is a front are elevational view of a weighted member.

Referring now to FIG. 5C, another configuration of a weighted member 100A is shown having a central body portion 300 with mounting apertures 304 disposed therethrough for coupling the weighted member 100A to the mounting bracket 80, for rotation therewith. The weighted member 100A further includes a number of spoke members 306 outwardly extending from the central body portion 300 and interconnecting the central body portion 300 with an outer ring 302. The outer ring 302 includes an outer diameter 308.

Figure 5D:
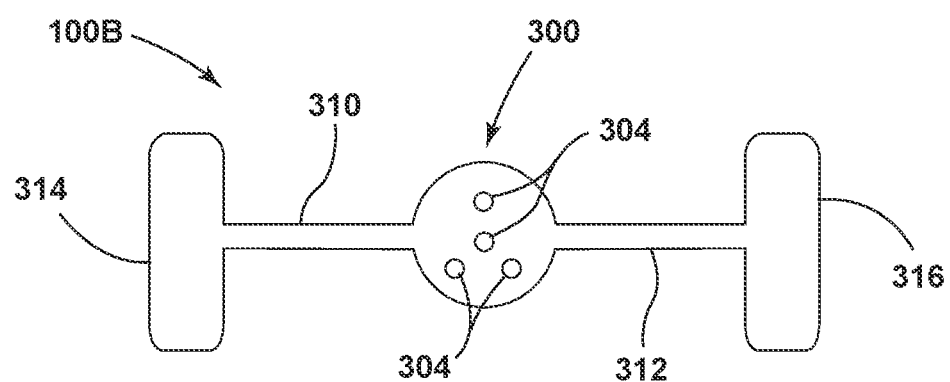
FIG. 5D is a front are elevational view of a weighted member.

Referring now to FIG. 5D, another configuration of a weighted member 100B is shown having a central body portion 300 with mounting apertures 304 disposed therethrough for coupling the weighted member 100B to the mounting bracket 80, for rotation therewith. The weighted member 100B further includes first and second arms 310, 312 outwardly extending from the central body portion 300. The first and second arms 310, 312 each include a weight 314, 316, respectively, that are interconnected to the central body portion 300 by the first and second arms 310, 312 and extended outwardly from the central body portion 300. Thus, as shown in FIGS. 5C and 5D, the weighted members 100A, 100B do not need to be disk-shaped weighted members, like weighted member 100 described above, but may include other configurations, so long as the weighted members are balanced and symmetrical.

Figure 6:
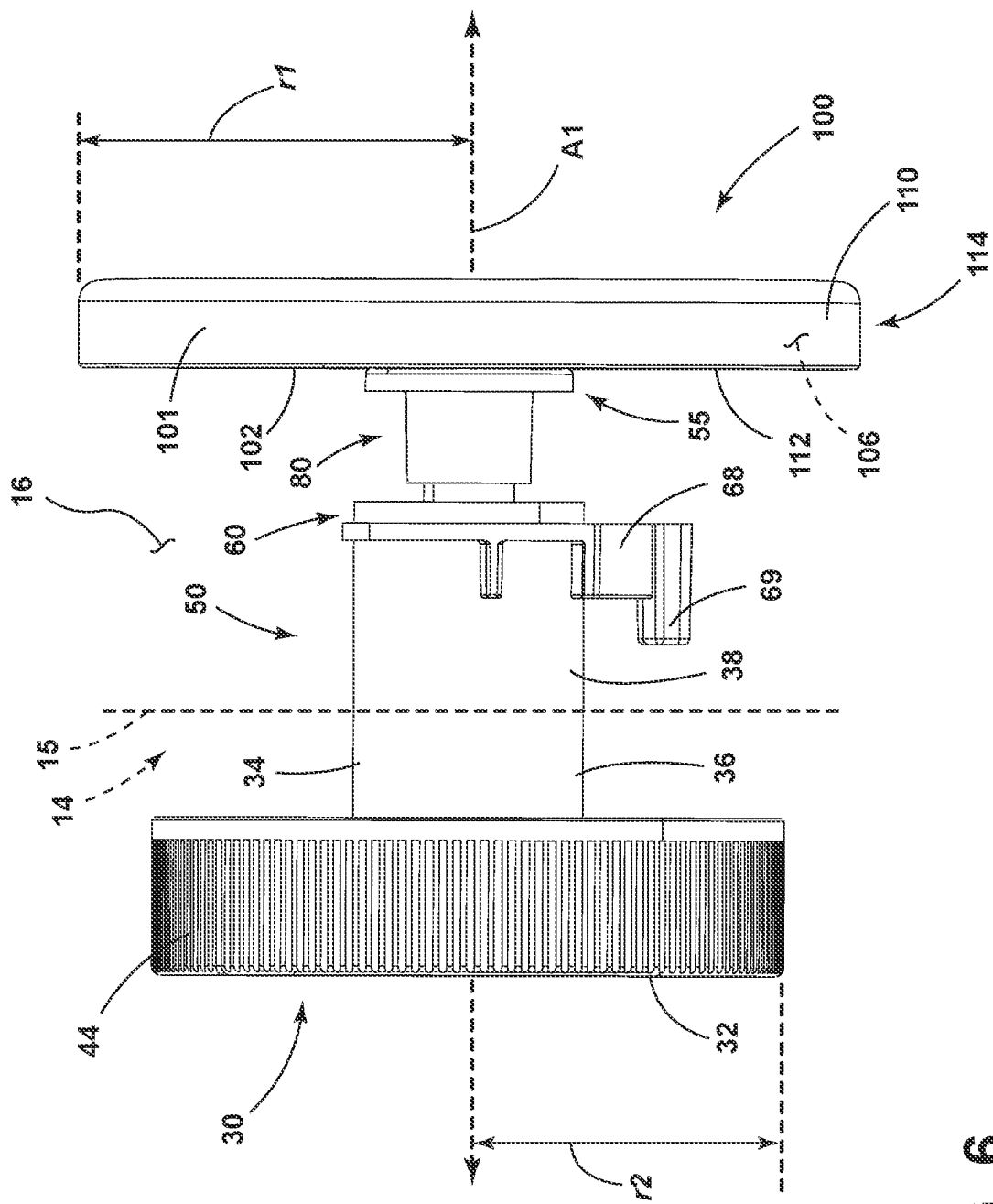
FIG. 6 is an assembled perspective view of the shaft assembly, knob and weighted member of FIG. 4.

Referring now to FIG. 6, the shaft assembly 50 is shown in an assembled condition and interconnecting the knob 30 and the weighted member 100. The rotational axis A1 is defined by the shaft assembly 50, such that the rotational inertia (I) (provided specifically by the weighted member 100) is equal to the mass (m) of the weighted member 100 times the square of the perpendicular distance (r) to the axis of rotation A1. As shown in FIGS. 4 and 6, the shaft assembly 50 interconnects the knob 30 with the weighted member 100 in a rigid manner, such that these parts rotate together when a user engages the knob 30. As noted above, the knob 30 includes an outer diameter 44 defined by the head portion 32 of the knob 30. As further noted above, the weighted member 100 includes an outer diameter 101 which is generally defined by the second sidewall 110 of the channel 106 disposed around the outer perimeter 114 of the weighted member 100. As shown in FIGS. 4 and 6, the outer diameter 44 of the knob 30 is less than the outer diameter 101 of the weighted member 100. Said differently, the outer diameter 101 of the weighted member 100 is greater than the outer diameter 44 of the knob 30. With reference to FIGS. 4 and 6, the outer diameter 101 of the weighted member 100 is twice the radius thereof as indicated at reference numeral r1. As further shown in FIGS. 4 and 6, the outer diameter 44 of the knob 30 is twice the radius thereof as indicated at reference numeral r2. In this way, the weighted member 100 provides a rotational inertia, realized by a user at the knob 30, that is consistent with the mass (m) of the weighted member 100, and the radius (r1) of the weighted member 100, both of which are features of the weighted member 100 that are greater than the mass and the radius (r2) of the knob 30. Thus, the present concept provides for a sensory experience for the user that includes a rotational inertia of the knob 30 (which is contemplated to be a plastic part) that is consistent with a heavier and larger knob. Again, the present concept provides this sensory feature at the externally accessible knob 30 while the weighted member 100 is concealed within the base unit 14 of the blender 10.

Figure 7:
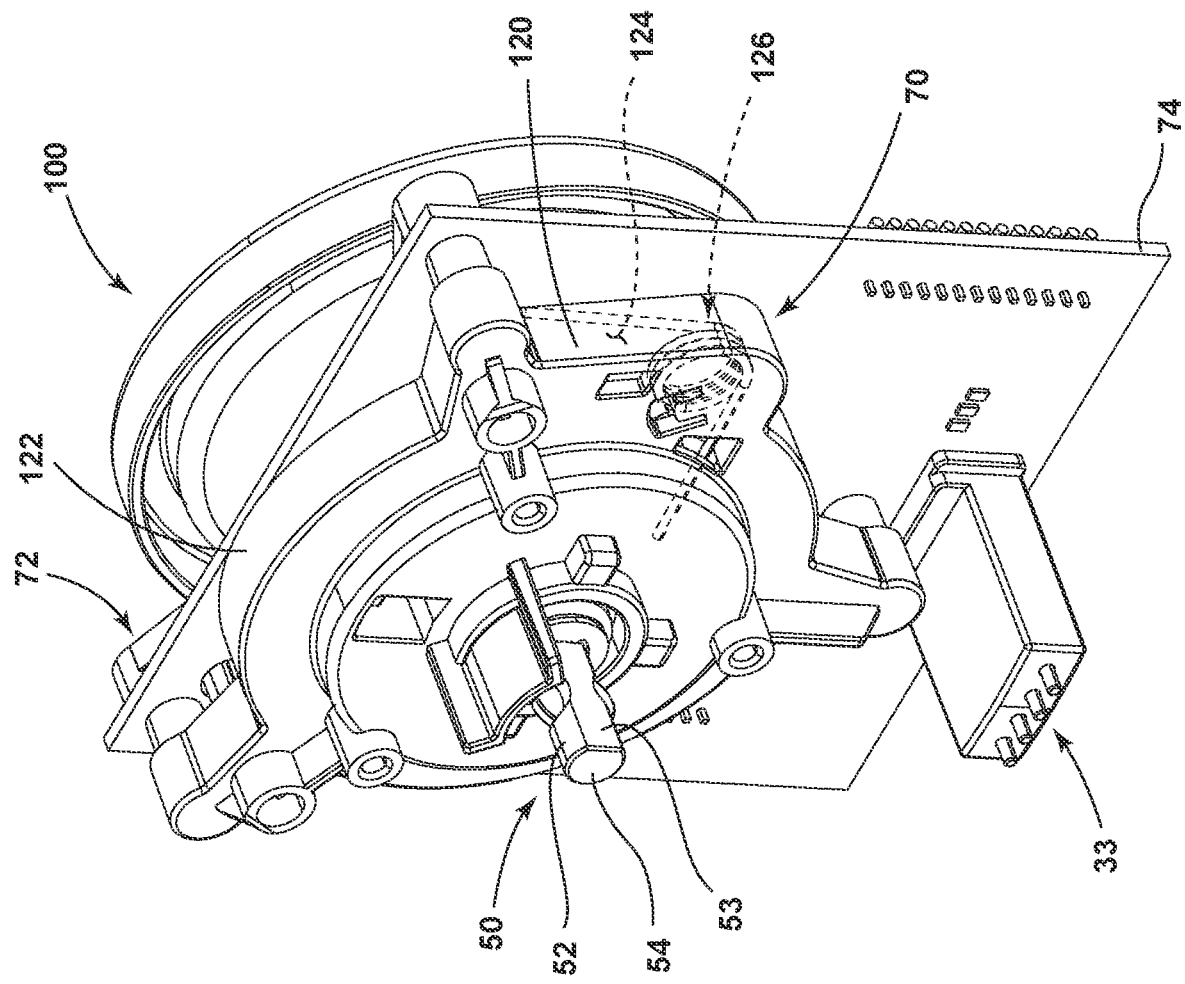
FIG. 7 is a top perspective view of motor control components for the appliance of FIG. 1A.
Figure 8:
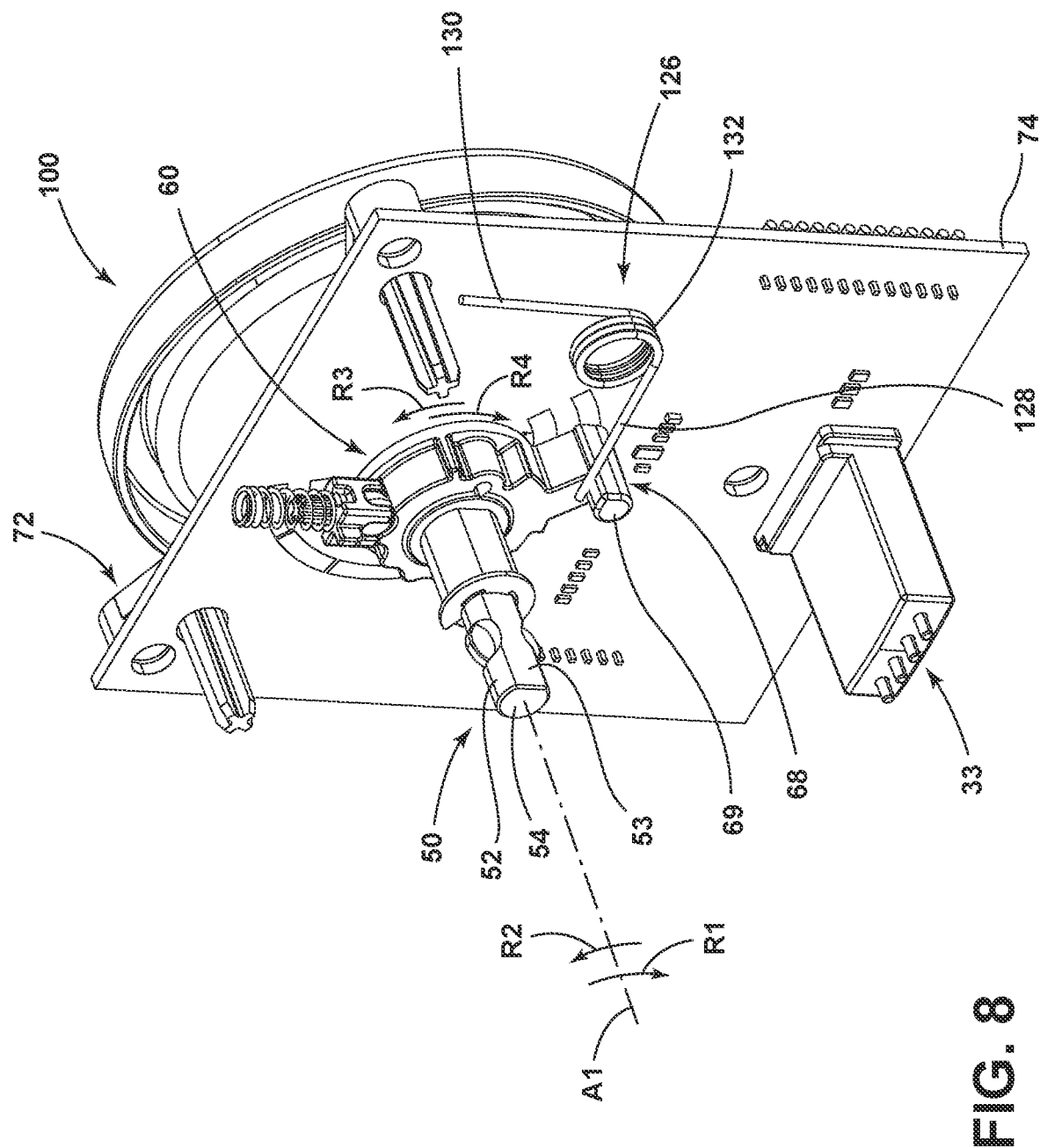
FIG. 8 is a top perspective view of the motor control components of FIG. 7 with a front support bracket removed therefrom.

Referring now to FIG. 7, the shaft assembly 50 is shown with the weighted member 100 coupled thereto, and the front and rear support brackets 70, 72 and the PCB 74 positioned therearound. The front support bracket 70 includes a sidewall 120 and a top wall 122. Together, the sidewall 120 and the top wall 122 cooperate to partially define an interior cavity 124 for the front support bracket 70. A spring member 126 is housed within the interior cavity 124 of the front support bracket 70, as partially shown in FIG. 2. The spring member 126 is shown in phantom in FIG. 7. With reference to FIG. 8, the spring member 126 is revealed with the front support bracket 70 removed. The spring member 126 includes a first arm 128 and a second arm 130 with a coiled portion 132 disposed therebetween. As shown in FIG. 8, the switch assembly 60 is coupled to the shaft member 52 and is housed within the interior cavity 124 of the front support bracket 70, as partially shown in FIG. 2. The first arm 128 of the spring member 126 engages the engagement member 68 of the switch assembly 60 at the flange 69 thereof. The second arm 130 of the spring member 126 engages the sidewall 120 of the front support bracket 70. Thus, rotating the shaft assembly 50 in the rotational direction as indicated by arrow R2 raises the engagement member 68 in the direction as indicated by arrow R3, such that a force is applied to the spring 126. Rotation of the shaft assembly 50 in the rotational direction as indicated by arrow R2 is contemplated to be provided by a user engaging the knob 30 and rotating the knob 30 towards the left. It is contemplated that rotation of the knob 30 in the rotational direction as indicated by arrow R2 provides a pulse setting which rotates the switch assembly 60 in the direction as indicated by arrow R3 to load the spring member 126. Once the force imparted on the knob 30 is removed, the spring member 126 resiliently rotates the switch assembly downward in the direction as indicated by arrow R4 to an off position shown in FIG. 8. Thus, the spring member 126 biases the switch assembly 60 to an off or at-rest position when the switch assembly 60 is rotated to a pulse setting which selectively powers the motor 18 in an intermittent blending procedure controlled by the user.

Figure 9:
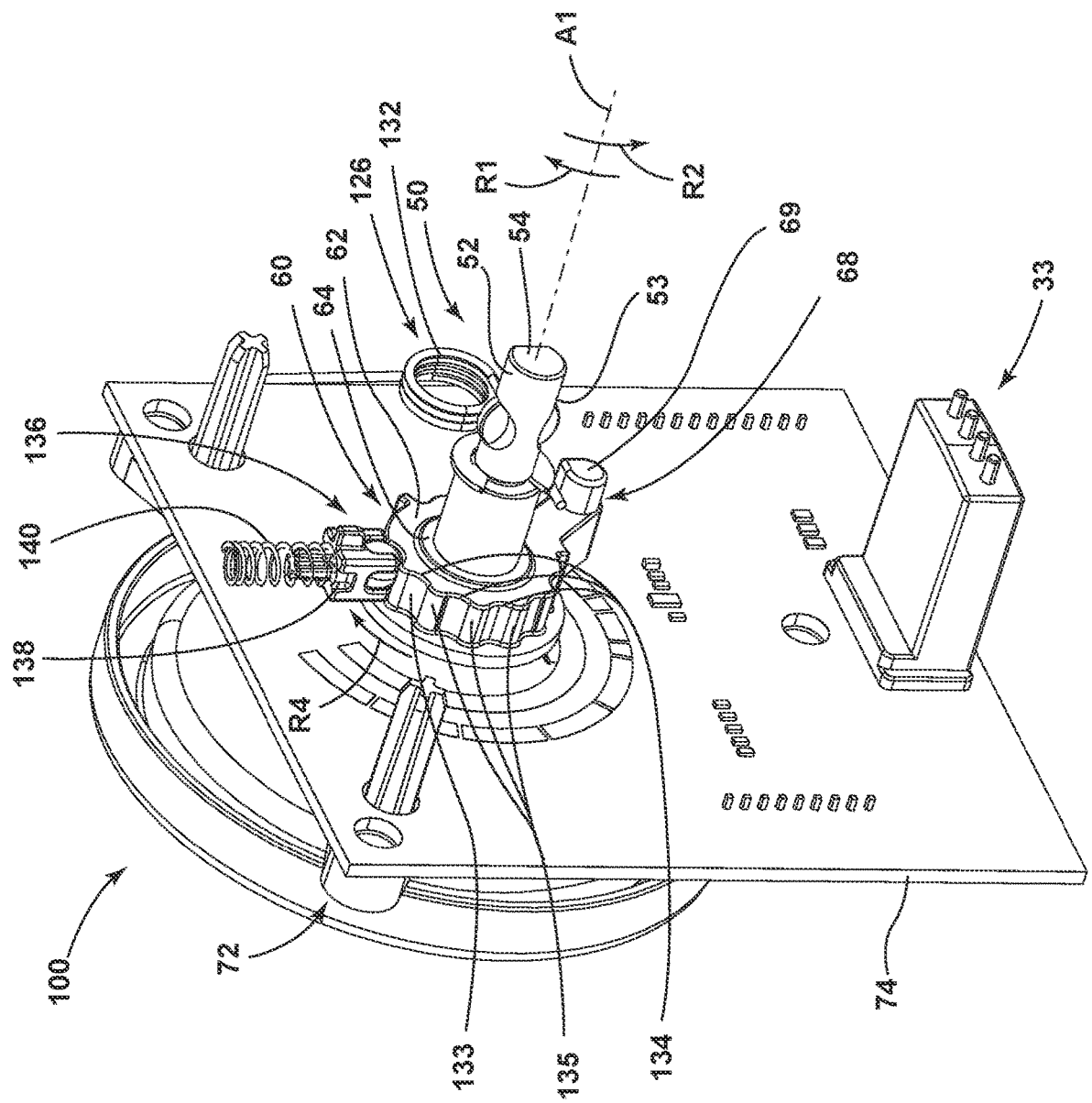
FIG. 9 is a top perspective view of the motor control components of FIG. 8.

Referring now to FIG. 9, the switch assembly 60 includes an upper surface 133 having a plurality of recesses 134 and ridges 135 disposed thereon. A detent feature 136 includes a detent member 138 in the form of a ball that is biased in a vertically downward direction by a spring member 140. The detent feature 136 is housed within the interior cavity 124 (FIG. 7) of the front support bracket 70 and is positioned such that the spring member 140 thereof acts against the top wall 122 (FIG. 7) of the front support bracket 70. Thus, when a user engages the knob 30 to rotate the knob 30 to the right in the rotational direction as indicated by arrow R1, the switch assembly 60 will rotate in the direction as indicated by arrow R4 and the detent member 138 will climb over the ridges 135 to load the spring member 140 and be received in adjacent recesses 134 along the upper surface 133 of the switch assembly 60, to which the detent member 138 is biased. In this way, a user is provided with tactile feedback as a speed selection is made at the switch assembly 60. It is contemplated that the speed selection may be provided in an ascending speed level or a descending speed level as the switch assembly 60 rotates in the direction as indicated by arrow R4. Rotation of the knob 30 to the right in the direction as indicated by arrow R1 and the switch assembly 60 in the direction as indicated by arrow R4 does not load the spring member 126, such that spring member 126 does not bias the switch assembly 60 back to the at-rest or off position shown in FIG. 8 when a speed selection is made by a user. As such, a motor speed may be selected by a user, and the motor 18 may remain at the selected motor speed until the user returns the switch assembly 60 to a lower speed selection or the at-rest or off position by rotating the knob 30 in the direction as indicated by arrow R2 to decrease the speed or turn off the motor.

In one aspect, the above-referenced blender 10 can include a controller in the form of a microprocessor, or the like, that can include programming to operate the blender 10, including based on user inputs received through the user interface 20 discussed above. In various aspects, the programming can include either firmware or software that is specifically adapted to operate the motor 18 via a current received from the battery 22. In one example, the programming can be adapted to maintain an acceptably low temperature of the battery 22 and/or the motor 18 in a proactive manner based on the current drawn by the motor 18. In the illustrated example of the blender 10, the knob 30 is provided to operate the motor 18 at different speeds (e.g., high, medium, and low). As can be appreciated, the operation of the motor 18 at these varying speeds will result in correspondingly varying current draws. In one example, low speed operation may result in a current draw of about 15 amps, with mid-speed operation having a current draw of 20 amps, and high speed operation drawing a current of 40 amps. In this manner, operation of the motor 18 at the high speed setting will result in faster heating of the motor 18 and/or the battery 22, such that a timer can be implemented that only allows operation at a speed drawing 40 amps for a certain amount of time to prevent excessive heating. In this manner, the controller programming can be such that, when the user fully rotates the knob 30 to the right, the motor 18 is operated at the full high speed for a predetermined interval (e.g., about 20 seconds, or in some examples about 10 seconds) before the speed is reduced (e.g., by between about 5% and 10% to reduce the heating effect of such operation, while still operating the motor 18 at a speed that may be perceived as acceptably high by the user. In this manner, the lower speed operations may allow for longer intervals (e.g., at least about 40 seconds) before a similar reduction in speed is implemented. The software can also implement a cooldown time interval requirement, such that the overall timer is maintained during rapid pulses when the knob 30 is intermittently turned to the left.

Figure 10:
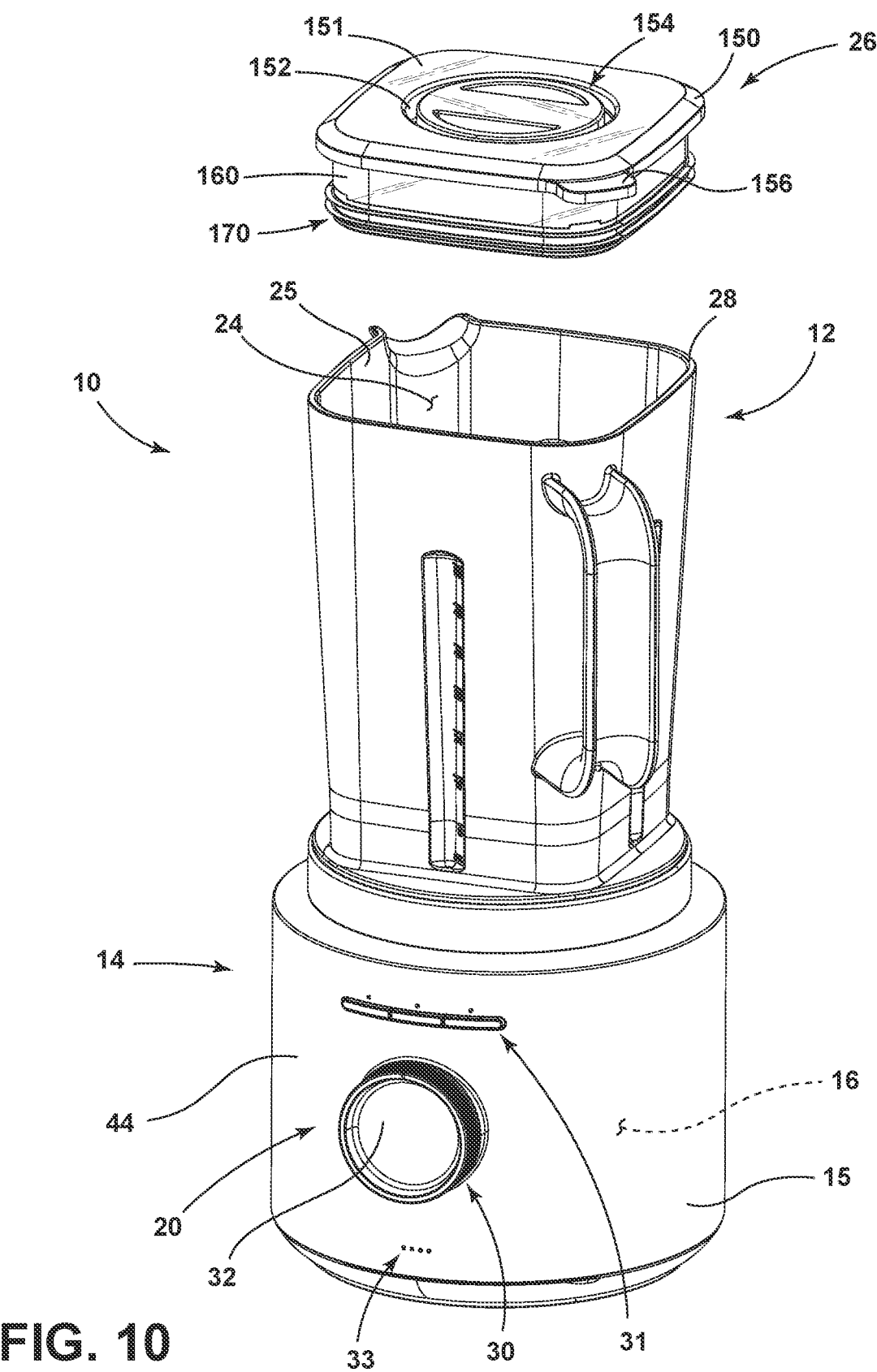
FIG. 10 is a top perspective view of the appliance of FIG. 1A with a lid assembly exploded away from the jar assembly.

Referring now to FIG. 10, the lid assembly 26 is shown exploded away from the open top 28 of the jar assembly 12 to thereby provide access to the inner cavity 24 of the jar assembly 12. The lid assembly 26 includes a body portion 150 having a head portion 151 with a centrally disposed aperture 152. A cap member 154 is removably received on the centrally disposed aperture 152 of the lid assembly 26. The lid assembly 26 further includes a handle 156 which extends outwardly from the head portion 151 and is contemplated to be engaged by a user to remove the lid assembly 26 from the open top 28 of the jar assembly 12. The lid assembly 26 further includes a stem portion 160 extending downwardly from the head portion 151. The stem portion 160 includes a seal member 170 disposed thereon. The seal member 170 is contemplated to be a removable seal member with respect to the lid assembly 26. In use, the seal member 170 is configured to seal against an interior surface 25 of the inner cavity 24 of the jar assembly 12 to keep food items within the jar assembly 12 during a blending procedure.

Figure 11:
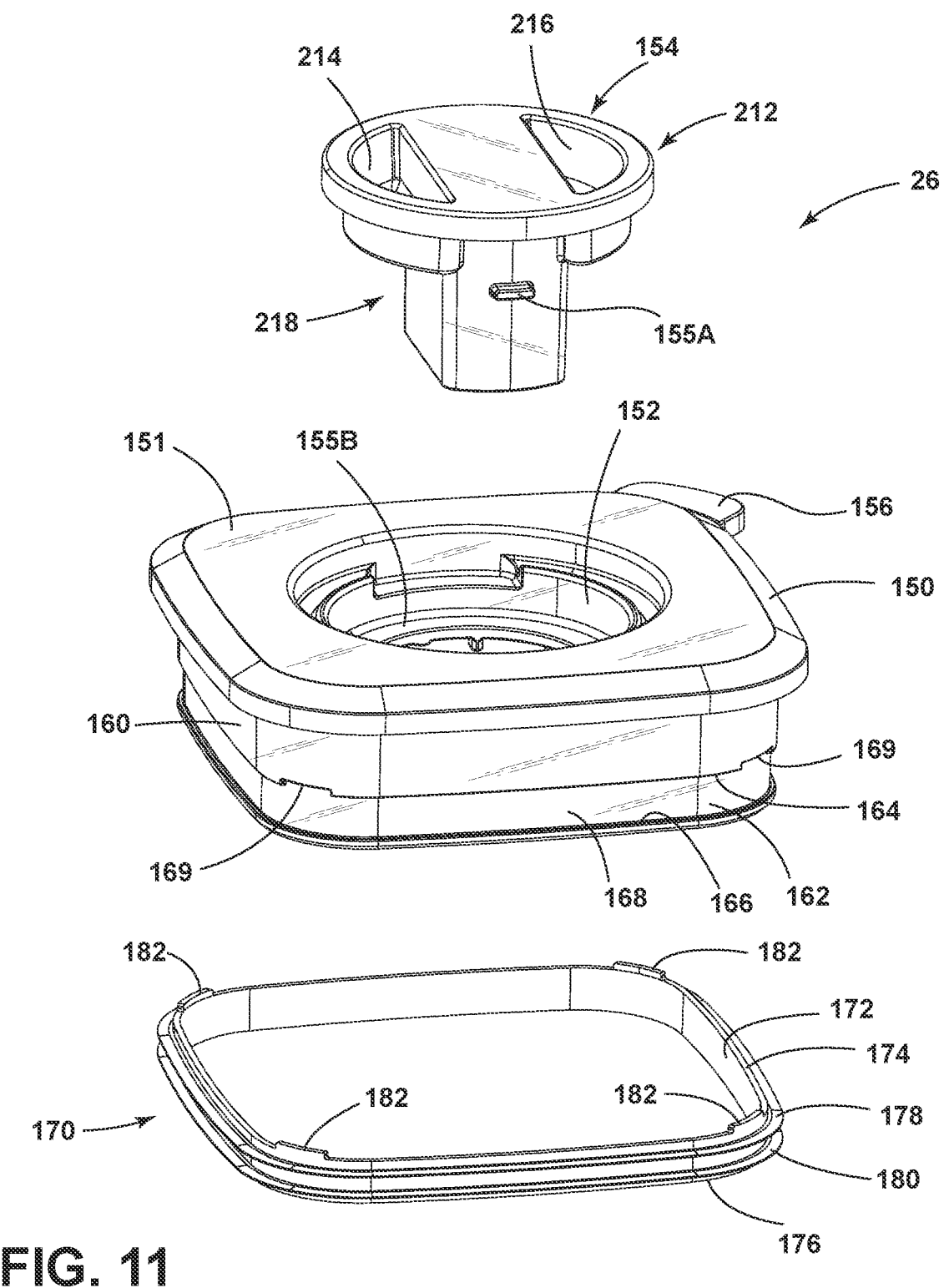
FIG. 11 is an exploded top perspective view of the lid assembly of FIG. 10.
Figure 12:
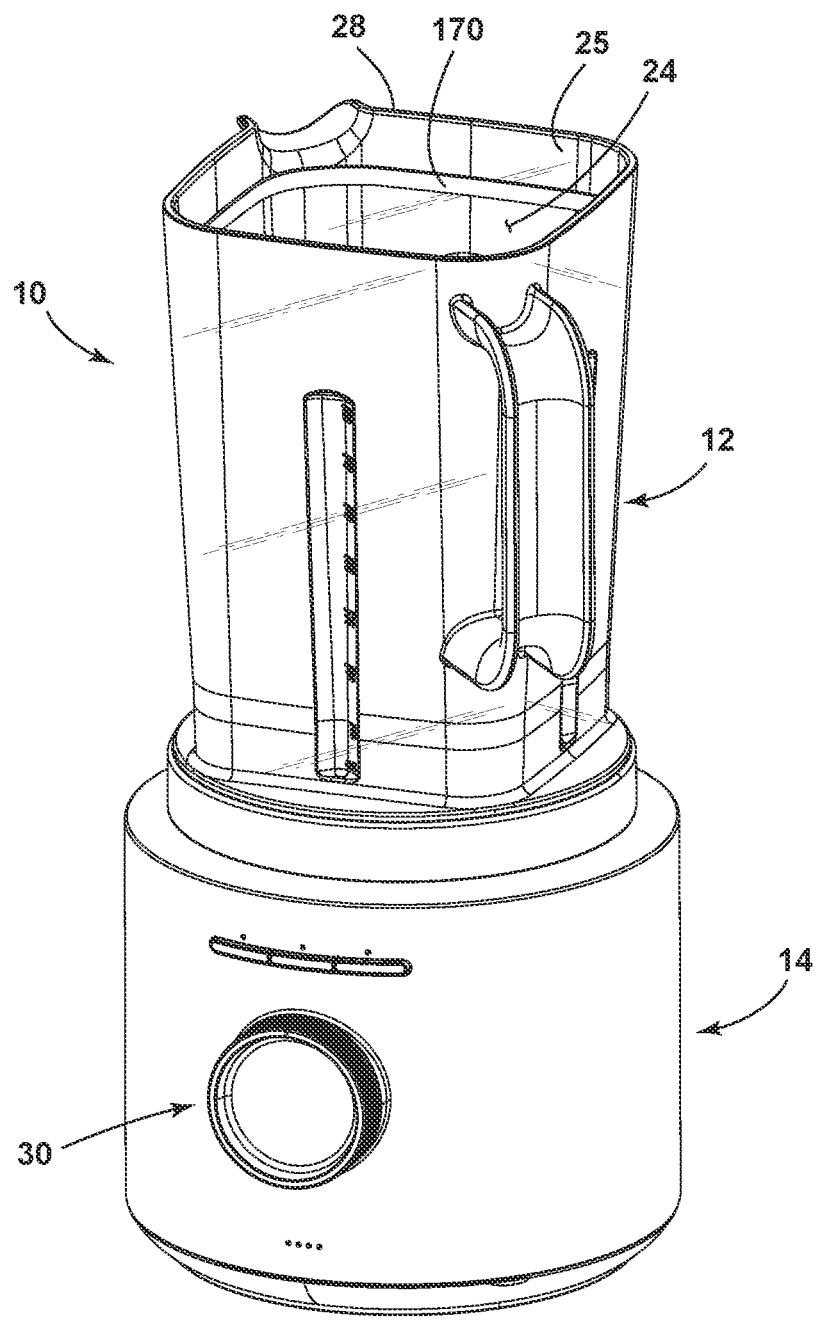
FIG. 12 is a top perspective view of the appliance of FIG. 10 with a seal member is shown disposed within the jar assembly.

Referring now to FIG. 11, the lid assembly 26 is shown with the cap member 154 removed from the centrally disposed aperture 152. The cap member 154 includes a head portion 212 having recesses 214, 216 disposed thereon which are contemplated to be engaged by a user to twist the cap member 154 into engagement with the body portion 150 of the lid assembly 26. The cap member 154 includes a number of interlock features 155A that cooperate with reciprocal interlock features 155B disposed within the body portion 150 of the lid assembly 26 at the centrally disposed aperture 152 to releasably retain the cap member 154 in place in a twist-lock configuration, as further described below. A cup portion 218 extends outwardly from the head portion 212 of the cap member 154 and may be used as a measuring cup, as further described below. Thus, the centrally disposed aperture 152 of the body portion 150 of the lid assembly 26 provides access to the inner cavity 24 of the jar assembly 12 when the cap member 154 is removed therefrom. As further shown in FIG. 11, the stem portion 160 of the lid assembly 26 includes a receiving channel 162 that is circumferentially disposed around an entirety of the stem portion 160. As such, the receiving channel 162 defines a recess provided around the stem portion 160. The receiving channel 162 is an outwardly opening receiving channel that may include a generally C-shaped structure having an upper edge 164, a lower edge 166 and an intermediate portion 168 interconnecting the upper edge 164 and the lower edge 166. The receiving channel 162 further includes a plurality of locating recesses 169 that upwardly extend from the upper edge 164 thereof. As further shown in FIG. 11, the seal member 170 includes a body portion 172 having an upper edge 174 and a lower edge 176. Upper and lower sweep members 178, 180 outwardly extend from the body portion 172 of the seal member 170. The upper and lower sweep members 178, 180 are configured to engage the interior surface 25 of the inner cavity 24 as received within inner cavity 24 of the jar assembly 12. This configuration is shown in FIG. 12, wherein the seal member 170 is positioned within the inner cavity 24 of the jar assembly 12. In the configuration shown in FIG. 12, is contemplated that the upper and lower sweep members 178, 180 are engaged with the interior surface 25 of the inner cavity 24 of the jar assembly 12.

Figure 13:
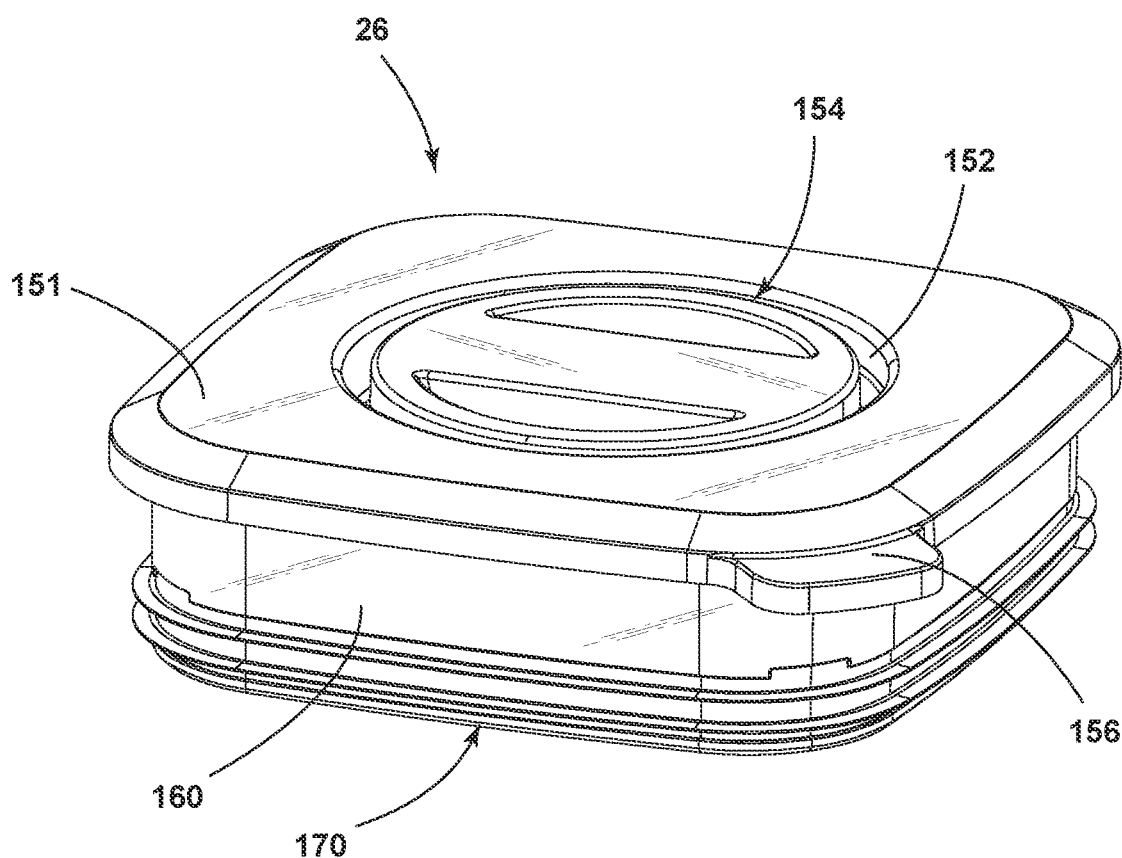
FIG. 13 is a top perspective view of a lid assembly.

The lid assembly 26 and the jar assembly 12 may be comprised of a clear or transparent polymeric material, as shown in FIGS. 10, 11 and 13. The seal member 170 may be comprised of a silicone material, such that the upper and lower sweep members 178, 180 are contemplated to be flexibly resilient members. As a removable member, the seal member 170 can be removed from the stem portion 160 of the lid assembly 26, such that the seal member 170 can be washed, and so can the receiving channel 162 of the lid assembly 26. Being a flexibly resilient member, the seal member 170 can be stretched to move into the receiving channel 162 over the lower edge 166 of the receiving channel 162. As shown in FIG. 11, the seal member 170 includes a plurality of locating features 182 that upwardly extend from the upper edge 174 of the body portion 172 of the seal member 170. In the configuration shown in FIG. 11, it is contemplated that the upwardly extending locating features 182 are received in the reciprocal locating recesses 169 of the receiving channel 162 as the seal member 170 is positioned therein. As shown in the embodiment of FIG. 11, the seal member includes four upwardly extending locating features 182 that are contemplated to be received in four locating recesses 169 of the receiving channel 162 disposed at corner portions of the receiving channel 162. However, more or fewer locating features may be provided on the seal member 170.

Figure 14:
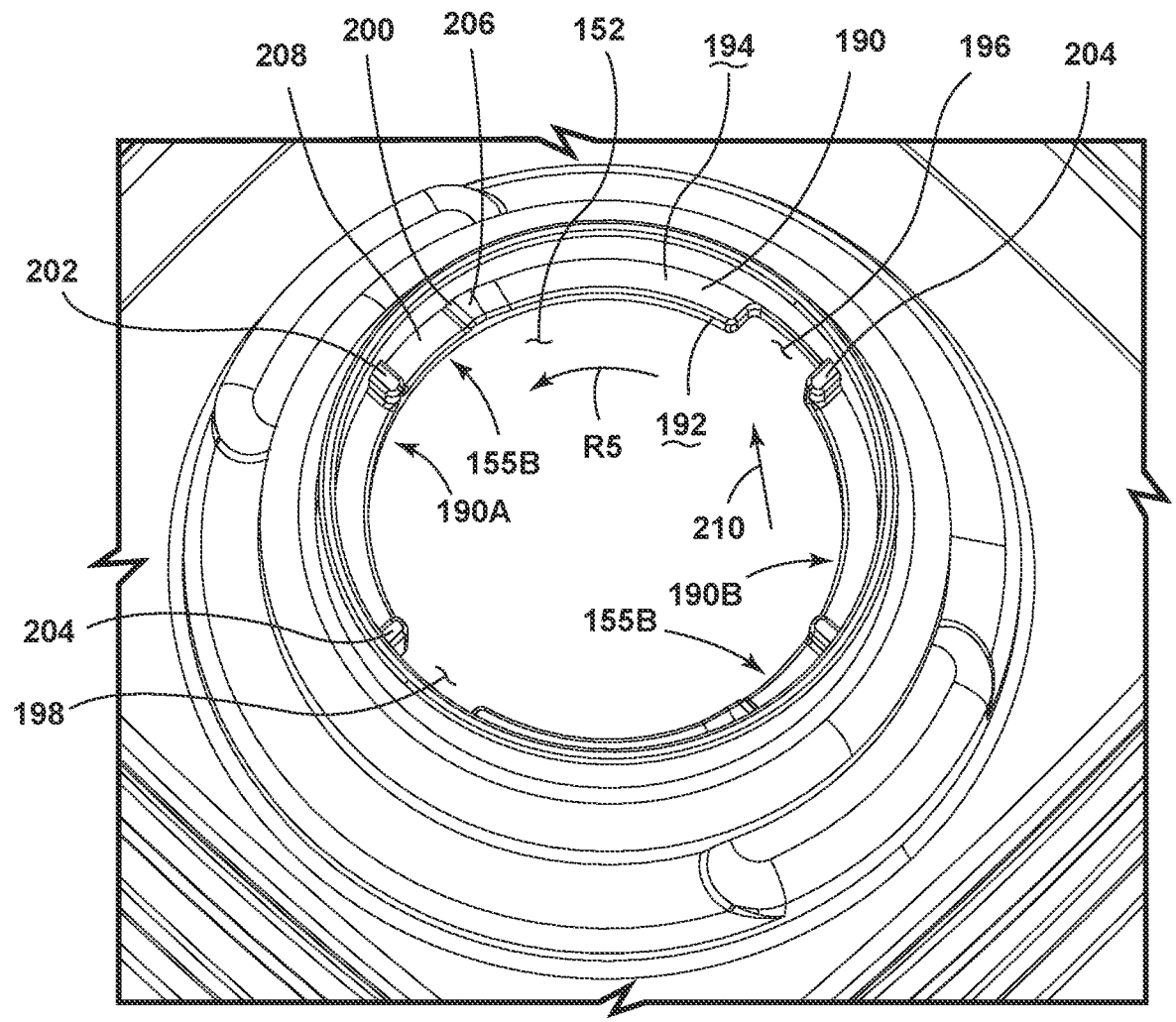
FIG. 14 is a fragmentary bottom perspective view of the lid assembly of FIG. 13 with a cap member removed therefrom.
Figure 15:
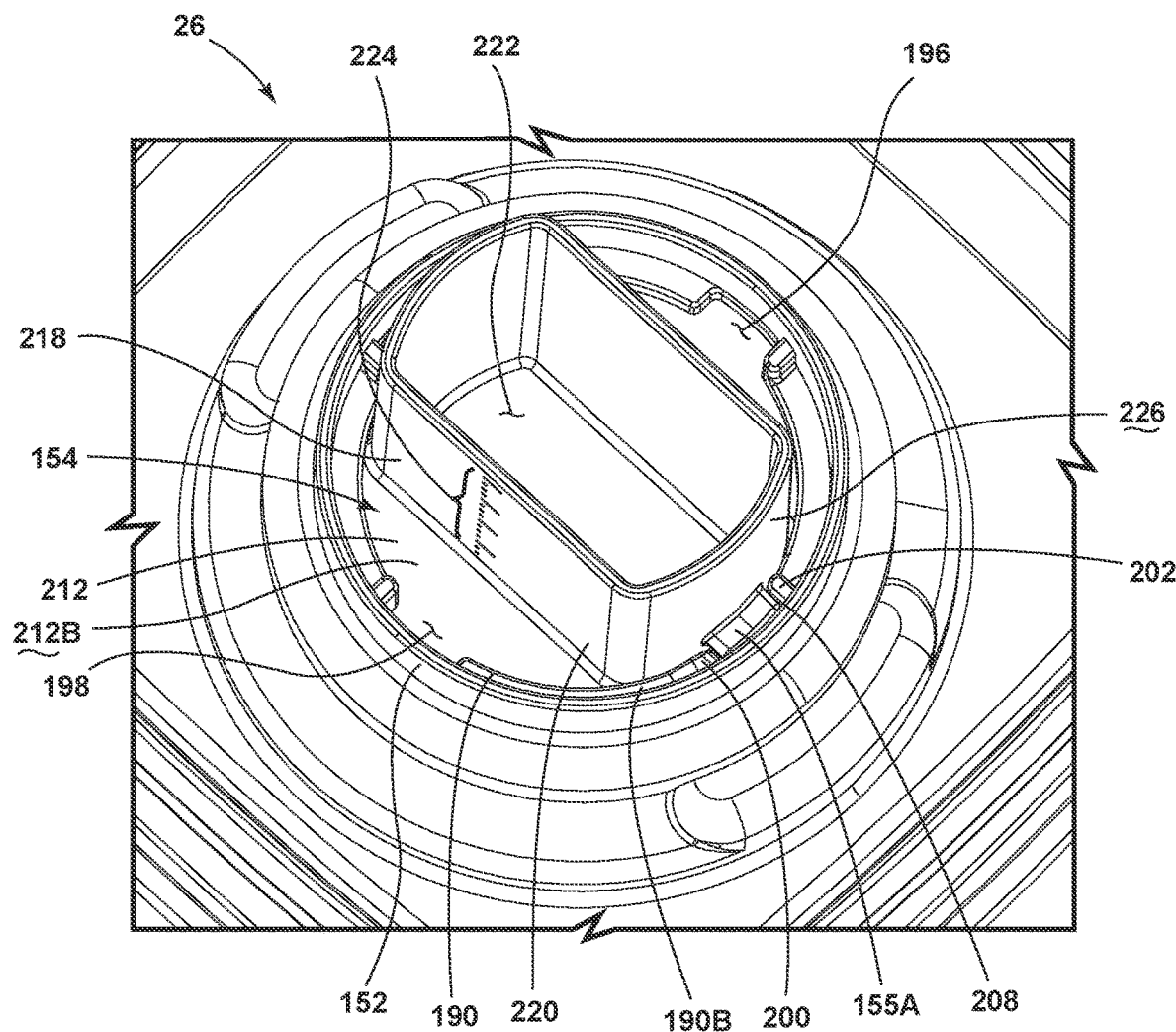
FIG. 15 is a fragmentary bottom perspective view of the lid assembly of FIG. 13.

Referring now to FIG. 14, the body portion 150 of the lid assembly 26 is shown from a bottom perspective view. The centrally disposed aperture 152 has the cap member 154 removed therefrom to reveal a rim portion 190. The rim portion 190 includes upper and lower surfaces 192, 194. Further, the rim portion 190 includes a first portion 190A and a second portion 190B with access slots 196, 198 positioned therebetween. The first and second portions 190A, 190B are identical to one another, such that the description of the first portion 190A provided herein will also describe the second portion 190B. The first portion 190A of the rim portion 190 includes a first engagement member 200 spaced-apart from a second engagement member 202 which is further spaced-apart from a third engagement member 204. The second and third engagement members 202 and 204 are substantially similar to one another and outwardly extend from the lower surface 194 of the rim portion 190. The first engagement member 200 also outwardly extends from the lower surface 194 of the rim portion 190 and includes an angled leading portion 206 that acts as an introductory ramp portion for one of the interlock features 155A of the cap member 154. Positioned between the first engagement member 200 and the second engagement member 202 is a cradle portion 208, wherein an interlock feature 155A of the cap member 154 is received when the cap member 154 is in a locked position on the body portion 150 of the lid assembly 26, as shown in FIG. 15. Thus, when the cap member 154 is coupled to the body portion 150 of the lid assembly 26, the cap member 154 is vertically received at the centrally disposed aperture 152 of the body portion 150 of the lid assembly 26 in the direction as indicated by arrow 210. In engaging the body portion 150 of the lid assembly 26, the interlock feature 155A of the cap member 154 will be received through the access slot 196 to then engage the lower surface 194 of the rim portion 190. Once received through the access slot 196, the interlock feature 155A of the cap member 154 will rotate in the direction as indicated by arrow R5 until it reaches the angled leading portion 206 of the first engagement member 200. As a user continues the rotation of the cap member 154, the interlock feature 155A will pass over the first engagement member 200 and stop rotational movement at the second engagement member 202. When rotation of the interlock feature 155A is stopped by the second engagement member 202, the interlock features 155A is received in the cradle portion 208 of the rim portion 190, as shown in FIG. 15. When the interlock feature 155A is received through the access slot 196, rotation in an opposite direction relative to the rotational direction R5 noted above is inhibited by the third engagement member 204 of the second portion 190B of the rim portion 190. In this way, the features described above provided on the rim portion 190 define the interlock features 155B of the body portion 150 of the lid assembly 26.

Referring now to FIG. 15, the cap member 154 is shown received on the body portion 150 of the lid assembly 26, such that the cup portion 218 is positioned through the centrally disposed aperture 152. The cup portion 218 of the cap member 154 includes a sidewall 220 extending outwardly from a lower surface 212B of the head portion 212. The sidewall 220 surrounds a receiving well 222 which can be used by a user to measure ingredients when the cap member 154 is removed from the body portion 150 of the lid assembly 26. The cup portion 218 may further include ingredient measuring indicia 224 positioned on and visible on an outer surface 226 of the sidewall 220 for use in measuring ingredients received in the receiving well 222. The ingredient measuring indicia 224 may also be positioned on an inner surface of the sidewall 220. As used herein, the term "ingredient measuring indicia" describes visible markings on the cup portion 218 that indicate a volume of ingredients received within the receiving well 222. Such markings may include cup, tablespoon, teaspoon or any other volume metric suitable for measuring ingredients to be used in the blender 10. In FIG. 15, the interlock feature 155A of the cap member 154 is shown outwardly extending from the outer surface 226 of the sidewall 220 of the cup portion 218. In FIG. 15, the interlock feature 155A is shown as being received within the cradle portion 208 of the rim portion 190 of the body portion 150 of the lid assembly 26, such that the cap member 154 is shown in a locked position in FIG. 15. Rotating the cap member 154 such that the interlock features 155A thereof align with the access slots 196, 198 will rotate the cap member 154 to an unlocked position, wherein the cap member 154 can be released from the body portion 150 of the lid assembly 26. Thus, the cap member 154 is operable between locked and unlocked positions relative to the body portion 150 of the lid assembly 26 due to the reciprocal interlock features 155A and 155B provided therebetween.

According to one aspect of the present concept, an appliance includes a base unit having a sidewall surrounding an interior cavity. A shaft assembly includes a first portion extending outwardly from the sidewall of the base unit. The shaft assembly further includes a second portion positioned within the interior cavity. A weighted member is operably coupled to the second portion of the shaft assembly for rotation therewith. A knob is positioned on the first portion of the shaft assembly for rotation therewith. The weighted member increases the rotational inertia of the knob assembly as operably coupled thereto through the shaft assembly.

According to another aspect, an appliance includes a base unit having a sidewall surrounding an interior cavity. A shaft assembly is disposed through the sidewall of the base unit and includes first and second portions. A knob is operably coupled to the first portion of the shaft assembly and is externally accessible relative to the base unit. A weighted member is operably coupled to the second portion of the shaft assembly for rotation therewith. The weighted member is positioned within the interior cavity of the base unit.

According to another aspect, an appliance includes a base unit having a sidewall surrounding an interior cavity. A shaft member includes first and second ends. The second end is positioned within the interior cavity of the base unit and the first end is externally accessible relative to the base unit. A knob is positioned on the first end of the shaft member. The knob includes a head portion and a stem portion extending inwardly from the head portion. A distal end of the stem portion is positioned within the interior cavity of the base unit. A weighted member is operably coupled to the second end of the shaft member for rotation therewith within the interior cavity of the base unit.

According to one aspect of the present disclosure, an appliance includes a base unit with a sidewall surrounding an interior cavity. A shaft assembly includes a first portion extending outwardly from the sidewall of the base unit and a second portion positioned within the interior cavity. A weighted member is operably coupled to the second portion of the shaft assembly for rotation therewith. A knob is positioned on the first portion of the shaft assembly for rotation therewith.

According to another aspect, the knob includes a head portion and a stem portion. The stem portion inwardly extends from the head portion.

According to another aspect, the head portion of the knob is externally accessible relative to the base unit.

According to another aspect, the stem portion includes a distal end that is positioned within the interior cavity.

According to another aspect, the shaft assembly includes a shaft member having first and second ends. The first end of the shaft member is received in an interior channel disposed along the stem portion of the knob.

According to another aspect, a switch assembly is coupled to the second end of the shaft member for rotation therewith.

According to another aspect, the weighted member includes a generally planar body portion.

According to another aspect, the weighted member includes an outwardly opening channel defining an added mass disposed along an outer perimeter of the weighted member.

According to another aspect, the outwardly opening channel includes first and second sidewalls that are spaced-apart from one another and interconnected by an intermediate wall.

According to another aspect, the weighted member includes a mass that is greater than a mass of the knob.

According to another aspect, the weighted member includes an outer diameter that is greater than an outer diameter of the knob.

According to another aspect of the present disclosure, an appliance includes a base unit with a sidewall surrounding an interior cavity. A shaft assembly is disposed through the sidewall of the base unit and includes first and second portions. A knob is operably coupled to the first portion of the shaft assembly and is externally accessible relative to the base unit. A weighted member is operably coupled to the second portion of the shaft assembly for rotation therewith. The weighted member is positioned within the interior cavity of the base unit.

According to another aspect, the weighted member includes an outer diameter that is greater than an outer diameter of the knob.

According to another aspect, the knob is comprised of a plastic material.

According to another aspect, the weighted member is comprised of a metal material.

According to yet another aspect of the present disclosure, an appliance includes a base unit with a sidewall surrounding an interior cavity. A shaft member includes a first end and a second end. The second end is positioned within the interior cavity of the base unit and the first end is externally accessible relative to the base unit. A knob is positioned on the first end of the shaft member. A weighted member is operably coupled to the second end of the shaft member for rotation therewith within the interior cavity of the base unit.

According to another aspect, the knob includes a head portion and a stem portion extending inwardly from the head portion.

According to another aspect, the stem portion includes a distal end that is positioned within the interior cavity of the base unit.

According to another aspect, the weighted member includes an added mass disposed along an outer perimeter of the weighted member.

According to another aspect, the weighted member includes an outer diameter that is greater than an outer diameter of the knob.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An appliance, comprising:
    a base unit having a sidewall surrounding an interior cavity;
    a shaft assembly having a first portion extending outwardly from the sidewall of the base unit and a second portion positioned within the interior cavity;
    a weighted member operably coupled to a distal end of the second portion of the shaft assembly for rotation therewith;
    a switch assembly coupled to the shaft within the interior cavity and spaced-apart from the weighted member; and
    a knob positioned on the first portion of the shaft assembly for rotation therewith.

2. The appliance of claim 1, wherein the knob includes a head portion and a stem portion, and further wherein the stem portion inwardly extends from the head portion.

3. The appliance of claim 2, wherein the head portion of the knob is externally accessible relative to the base unit.

4. The appliance of claim 3, wherein the stem portion includes a distal end that is positioned within the interior cavity.

5. The appliance of claim 3, wherein the shaft assembly includes a shaft member having first and second ends, and further wherein the first end of the shaft member is received in an interior channel disposed along the stem portion of the knob.

6. The appliance of claim 5, including:
    a switch assembly coupled to the second end of the shaft member for rotation therewith.

7. The appliance of claim 1, wherein the weighted member includes a generally planar body portion.

8. The appliance of claim 7, wherein the weighted member includes an outwardly opening channel defining an added mass disposed along an outer perimeter of the weighted member.

9. The appliance of claim 8, wherein the outwardly opening channel includes first and second sidewalls that are spaced-apart from one another and interconnected by an intermediate wall.

10. The appliance of claim 1, wherein the weighted member includes a mass that is greater than a mass of the knob.

11. The appliance of claim 10, wherein the weighted member includes an outer diameter that is greater than an outer diameter of the knob.

12. An appliance, comprising:
    a base unit having a sidewall surrounding an interior cavity;
    a shaft assembly disposed through the sidewall of the base unit and having first and second portions;
    a knob operably coupled to the first portion of the shaft assembly and externally accessible relative to the base unit;
    a printed circuit board disposed around the shaft;
    a switch assembly operably coupled to the shaft on a first side of the printed circuit board; and a weighted member operably coupled to the second portion of the shaft assembly for rotation therewith, wherein the weighted member is positioned within the interior cavity of the base unit and disposed on a second side of the printed circuit board.

13. The appliance of claim 12, wherein the weighted member includes an outer diameter that is greater than an outer diameter of the knob.

14. The appliance of claim 13, wherein the knob is comprised of a plastic material.

15. The appliance of claim 14, wherein the weighted member is comprised of a metal material.

16. An appliance, comprising:
a base unit having a sidewall surrounding an interior cavity;
a shaft member having first and second ends, wherein the second end is positioned within the interior cavity of the base unit and the first end is externally accessible relative to the base unit;
a knob positioned on the first end of the shaft member;
a weighted member operably coupled to the second end of the shaft member for rotation therewith within the interior cavity of the base unit; and
a switch assembly coupled to the shaft for rotation therewith, wherein the switch assembly is positioned between the knob and the weighted member and spaced-apart therefrom.

17. The appliance of claim 16, wherein the knob includes a head portion and a stem portion extending inwardly from the head portion.

18. The appliance of claim 17, wherein the stem portion includes a distal end, and further wherein the distal end of the stem portion is positioned within the interior cavity of the base unit.

19. The appliance of claim 16, wherein the weighted member includes an added mass disposed along an outer perimeter of the weighted member.

20. The appliance of claim 19, wherein the weighted member includes an outer diameter that is greater than an outer diameter of the knob.

\* \* \* \* \*